(12) United States Patent
Sheinberg et al.

(10) Patent No.: US 9,911,144 B1
(45) Date of Patent: Mar. 6, 2018

(54) SYSTEM AND METHOD FOR TARGETING INFORMATION BASED ON MESSAGE CONTENT IN A REPLY

(71) Applicant: Google Inc., Mountain View, CA (US)

(72) Inventors: Alan B. Sheinberg, San Francisco, CA (US); Stanley Chen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/429,661

(22) Filed: Feb. 10, 2017

Related U.S. Application Data

(63) Continuation of application No. 13/954,073, filed on Jul. 30, 2013, now Pat. No. 9,596,195, which is a
(Continued)

(51) Int. Cl.
*G06F 17/27* (2006.01)
*G06F 15/16* (2006.01)
(Continued)

(52) U.S. Cl.
CPC ... *G06Q 30/0277* (2013.01); *G06F 17/30864* (2013.01); *G06Q 30/0244* (2013.01); *H04L 51/04* (2013.01); *H04L 51/18* (2013.01)

(58) Field of Classification Search
USPC ........ 709/200, 204–207, 247, 218, 219, 224
See application file for complete search history.

(56) References Cited

U.S. PATENT DOCUMENTS

| | | | |
|---|---|---|---|
| 5,815,671 A * | 9/1998 | Morrison | H04H 20/106 348/E7.024 |
| 6,799,199 B1 * | 9/2004 | Segal | H04L 12/1813 707/999.006 |

(Continued)

FOREIGN PATENT DOCUMENTS

| | | |
|---|---|---|
| CN | 200580016593 | 3/2005 |
| CN | 101014946 | 8/2007 |

(Continued)

OTHER PUBLICATIONS

USPTO File History in U.S. Appl. No. 11/215,544, filed Aug. 29, 2005, Jacobs et al., File History retrieved on Aug. 6, 2012, 518 pages.
(Continued)

Primary Examiner — Jude Jean Gilles
(74) Attorney, Agent, or Firm — Fish & Richardson P.C.

(57) ABSTRACT

A method of presenting information to a party through a messaging application is described. Responsive to receipt of a communication from a party (e.g., the first user), a reply is sent. The communication and the reply is presented in an interface to the sender. The messaging system determines matching content that is relevant to one or both of the communication and the reply and determines a quality of the match. Determining the quality of the match may include determining a score for an advertisement based on the advertisement's responsiveness to content identified in the reply message that was sent. Based on a determination that the quality is above a threshold, the matching content is presented along with the communication and the reply.

24 Claims, 30 Drawing Sheets

Related U.S. Application Data continuation of application No. 12/875,621, filed on Sep. 3, 2010, now Pat. No. 8,521,823.

(60) Provisional application No. 61/240,163, filed on Sep. 4, 2009.

(51) Int. Cl.
*G06Q 30/02* (2012.01)
*H04L 12/58* (2006.01)
*G06F 17/30* (2006.01)

(56) References Cited

U.S. PATENT DOCUMENTS

| | | | |
|---|---|---|---|
| 7,069,586 B1* | 6/2006 | Winneg | G06F 21/52 713/189 |
| 7,136,915 B2 | 11/2006 | Rieger, III | |
| 7,191,223 B1* | 3/2007 | Zamir | H04L 12/1813 709/207 |
| 7,493,242 B1 | 2/2009 | Garcia | |
| 7,543,068 B2 | 6/2009 | Aaron | |
| 7,970,841 B2* | 6/2011 | Wang | H04L 12/5835 348/468 |
| 8,171,107 B2 | 5/2012 | Vignisson | |
| 8,402,096 B2 | 3/2013 | Affronti et al. | |
| 8,468,157 B2 | 6/2013 | Saito | |
| 8,521,823 B1 | 8/2013 | Sheinberg et al. | |
| 2003/0191689 A1 | 10/2003 | Bosarge et al. | |
| 2003/0233419 A1 | 12/2003 | Beringer | |
| 2004/0049598 A1 | 3/2004 | Tucker et al. | |
| 2005/0038861 A1 | 2/2005 | Lynn et al. | |
| 2005/0222903 A1 | 10/2005 | Buchheit et al. | |
| 2006/0167747 A1 | 7/2006 | Goodman et al. | |
| 2006/0265230 A1 | 11/2006 | Shiga | |
| 2007/0043824 A1 | 2/2007 | Fremantle | |
| 2007/0239516 A1 | 10/2007 | Smith | |
| 2007/0264956 A1* | 11/2007 | Bicker | G06Q 10/10 455/186.1 |
| 2008/0033792 A1 | 2/2008 | Rosner | |
| 2008/0160936 A1 | 7/2008 | Chiang et al. | |
| 2008/0195954 A1 | 8/2008 | Dharmarajan et al. | |
| 2008/0235200 A1 | 9/2008 | Washington et al. | |
| 2008/0320107 A1 | 12/2008 | Park | |
| 2009/0005089 A1* | 1/2009 | Paik | H04L 12/581 455/466 |
| 2009/0025053 A1 | 1/2009 | Park et al. | |
| 2009/0049344 A1 | 2/2009 | Kawamura | |
| 2009/0171948 A1 | 7/2009 | Solomon et al. | |
| 2009/0319911 A1 | 12/2009 | McCann et al. | |
| 2010/0027051 A1 | 2/2010 | Hamilton, II | |
| 2010/0042749 A1 | 2/2010 | Barton | |
| 2010/0145694 A1* | 6/2010 | Ju | G10L 15/1815 704/235 |
| 2010/0185957 A1 | 7/2010 | Van Ieperen | |
| 2010/0241749 A1 | 9/2010 | Rasmussen et al. | |
| 2010/0251362 A1 | 9/2010 | Gillum et al. | |
| 2010/0323613 A1 | 12/2010 | Imaeda | |
| 2012/0330929 A1 | 12/2012 | Kowalski et al. | |

FOREIGN PATENT DOCUMENTS

| | | |
|---|---|---|
| KR | 1020060135929 | 12/2006 |
| WO | 2005/098712 | 10/2005 |

OTHER PUBLICATIONS

USPTO File History in U.S. Appl. No. 11/215,543, filed Aug. 29, 2005, Carobus et al., File History retrieved on Aug. 6, 2012, 777 pages.

USPTO File History in United States Application No. 11/111,166, filed Apr. 20, 2005, Wang et al., File History retrieved on Aug. 6, 2012, 344 pages.

Supplementary European Search Report in European Application No. 05731164.9, dated Mar. 5, 2008, 3 pages.

Written Opinion in International Application No. PCT/US2005/10839, dated Nov. 16, 2005, 3 pages.

International Preliminary Report on Patentability in International Application No. PCT/US2005/10839, dated Oct. 4, 2006, 4 pages.

* cited by examiner

Add or Update Contact

Name: John Doe
Primary Email: johndoe@doamin.com
Notes: 1600 Amphitheatre Parkway
Mountain View, CA 94043

1350 add more contact info

Save  Cancel

FIG. 13C

ITINERARY  INBOX COB_TEST ITIN
★ URNAM         REPLY  MORE OPTIONS  AUG 24 (1 DAY AGO)
DATE: NOV 08 2000
SERVICE    DATE FROM         TO        DEPART ARRIVE
CONTINENTAL AIRLINES 01DEC HOUSTON TX  NEW YORK NY  115P  547P
CO 1970  Q  FRI  G.BUSH INTERCO LA GUARDIA
            TERMINAL C    TERMINAL M
            SNACK          NON STOP
            RESERVATION CONFIRMED      3:32 DURATION
         AIRCRAFT: BOEING 737-300
         SEAT 16C NO SMOKING CONFIRMED

CONTINENTAL AIRLINES 03DEC NEW YORK NY  CLEVELAND OH  120P  259P
CO 1905  Q  SUN  LA GUARDIA     HOPKINS INT
            TERMINAL M
                           NON STOP
            RESERVATION CONFIRMED      1:39 DURATION
         AIRCRAFT: BOEING 737-300
         SEAT 21A NO SMOKING CONFIRMED

CONTINENTAL AIRLINES 03DEC CLEVELAND OH HOUSTON TX  405P  605P
CO 1999  Q  SUN  HOPKINS INT    G.BUSH INTERCO
                                TERMINAL C
            SNACK          NON STOP
            RESERVATION CONFIRMED      3:00 DURATION
         AIRCRAFT: MCDONNELL DOUGLAS ALL MD-80 SERIES
         SEAT 27D NO SMOKING CONFIRMED
         THIS IS A NON-REFUNDABLE FARE THAT REQUIRES
         TRAVEL ON THESE SPECIFIC DATES AND FLIGHTS.
         ANY CHANGES WILL RESULT IN A PENALTY AND/OR
                ADDITIONAL COLLECTION.
         ********************
         YOUR TICKET REFLECTS A NEGOTIATED DISCOUNT FROM THE TAP
            THE PUBLISHED FARE FOR THIS TICKET IS $206.00
         ******************************************

🖶 PRINT
🗗 NEW WINDOW

WOULD YOU LIKE TO....  1410
ADD TRIP TO CALENDAR   1420
GET WEATHER FORECAST FOR
CLEVELAND
SEARCH FOR HOTELS IN   1430
CLEVELAND 1440 (pointing to CLEVELAND OH)

FIG. 14A

« BACK TO CALENDAR  [SAVE] [CANCEL] [DUPLICATE EVENT]

CREATE EVENT
RECENT DRAFTS

▼ CALENDARS
MY CALENDARS [NEW]
☑
FAVORITES [ADD]
RECENT [ADD]
MANAGE CALENDARS

| | 8/2005 | | | | | » |
|---|---|---|---|---|---|---|
| S | 31 | 1 | 2 | 3 | 4 | 5 | 6 |
| M | 7 | 8 | 9 | 10 | 11 | 12 | 13 |
| T | 14 | 15 | 16 | 17 | 18 | 19 | 20 |
| W | 21 | 22 | 23 | 24 | 25 | 26 | 27 |
| T | 28 | 29 | 30 | 31 | 1 | 2 | 3 |
| F | 4 | 5 | 6 | 7 | 8 | 9 | 10 |

[RSS] [CAL]

WHAT: TRIP TO CLEVELAND — 1450
WHO: CLICK TO INVITE PEOPLE — 1452
WHERE: CLEVELAND — 1454 (MAP)
WHEN: [12/1/2005] [12:30PM] TO [1:30PM] [12/3/2005] — 1456
☐ ALL DAY EVENT

DESCRIPTION
CONTINENTAL AIRLINES 01 DEC HOUSTON TX   NEW YORK
NY   115P   547P   FRI   G.BUSH INTERCO LA GUARDIA
CO 1970   Q         TERMINAL C         TERMINAL M
              SNACK          NON STOP      3:32 DURATION
              RESERVATION CONFIRMED
          AIRCRAFT: BOEING 737-300
              SEAT 16C NO SMOKING CONFIRMED         — 1458
ZOOEY/WHARTON(I

CONTINENTAL AIRLINES 03DEC NEW YORK NY
CLEVELAND OH   120P   259P   SUN   LA GUARDIA     HOPKINS INT
CO 1905   Q         TERMINAL M              NON STOP
              RESERVATION CONFIRMED      1:39 DURATION
          AIRCRAFT: BOEING 737-300
              SEAT 21A NO SMOKING CONFIRMED
ZOOEY/WHARTON(I

CONTINENTAL AIRLINES 03DEC CLEVELAND OH HOUSTON
TX   405P   605P   SUN   HOPKINS INT    G.BUSH INTERCO
CO 1999   Q                              TERMINAL C

NOTIFICATION OPTIONS: CLICK TO OVERRIDE DEFAULT NOTIFICATION OPTIONS

Security Update Inbox cob test

☆ Uma     Reply   More options   12:16 pm (0 minutes ago)
In our continuing effort to provide security and stability to the revenue-producing systems here at EES, we would like to ask for your assistance with a few items. In general, we want to ensure that all business critical systems are clear from risk of downtime, which could negatively impact the business.

So, what does this mean to you? We need to make sure that any computer programs and files you use to do your job are protected and reside in an environment that is controlled by the IT infrastructure group. This serves several purposes, including:

Ensuring that everything business critical is backed up properly and can be recovered if a workstation's hard drive fails.

Ensuring that specialized programs like Cobra or BSOC or RGS which are business critical can easily be installed on any workstation by the IT group. This will keep the business up and running if you have to switch workstations suddenly.

Files: Spreadsheets, Exel macros, MS Access databases, and the like – Please make sure that any spreadsheets or MS Access databases you use for the business are not stored on your local computer drives. These files should be stored on a network-shared drive (in general, something other than C or D drive). That way, if that elephant comes back another night, we could get you another work station from which to operate without losing any of you valuable work.

Reply   Forward

🖶 Print
📧 New window

Would you like to...
📄 Get prices
   MS Access

About these links

NY DINING COMPANIONS - WWW.MATCH.COM - YOUR NEXT RESTAURANT RESERVATION CAN BE A SPECIAL ONE WITH MATCH.COM | SPONSORED LINK

«BACK TO "1-ME" | REMOVE LABEL "1-ME" | REPORT SPAM | DELETE | IMPORTANT | NOT IMPORTANT | MOVE TO ▼ | LABELS ▼ | MORE ACTIONS ▼ | 1 OF 9544 OLDER ›

WANT TO GO TO FIESTA DEL MAR FOR TACOS TOMORROW NIGHT?   INBOX ✖  1-ME ✖

☆ STEVE CROSSAN TO ME          SHOW DETAILS 11:52 AM (2 MINUTES AGO)    ↶ REPLY ▼

- NEW WINDOW
- PRINT ALL
- COLLAPSE ALL
- FORWARD ALL
- ADD TO CALENDAR
  WANT TO GO TO FIESTA D...
  TUE SEP 1, 2009 - ADD

↶ REPLY  → FORWARD  ⤷ REPLY BY CHAT TO STEVEN

―2810  [ YOUR MESSAGE HAS BEEN SENT ]

MEXICAN SALSA RECIPES - WWW.EVERYDAYHEALTH.COM/SPEEDYSALSA - QUICK, NUTRITIOUS & TASTY SALSA DO IT IN MINUTES & ER SPONSORED LINK

☆ ALAN SHEINBERG TO SCROSSAN          SHOW DETAILS 11:54 AM (0 MINUTES AGO)   ↶ REPLY ▼

ABSOLUTELY. THERE IS NO FINER A MEXICAN FOOD RESTAURANT. I MAY HAVE TO ASK THEM FOR RECIPES.

ON MON, AUG 31, 2009 AT 11:52 AM, STEVE CROSSAN <SCROSSAN@GOOGLE.COM> WROTE:

SPONSORED LINKS (FEEDBACK)
TUCSON MEXICAN RESTAURANT
FREE LOCAL GUIDE TO
TUCSON MEXICAN RESTAURANT
WWW.WHERETRAVELER.COM/TUCSON
TOP LAS VEGAS RESTAURANTS
FIND YOUR NEXT FIVE-STAR FAVORITE:
DISCOVER LAS VEGAS FINE DINING!
WWW.TRAVELSINTASTE.COM
IN THE MARKET CATERING
DOWNTOWN SAN DIEGO'S BEST CATERER
WORKING BREAKFAST, CORPORATE PARTIES
WWW.CATERING4SANDIEGO.COM
WELCOME TO OKLAHOMA
FIND PLACES TO EAT, SLEEP AND VISIT
IN OKLAHOMA BEFORE LEAVING HOME!
WWW.WELCOME2OKLAHOMA.COM
MI TIERRA CAFE & BAKERY
SINCE 1941 PECAN PRALINES
LARGEST ASSORTMENT OF MEXICAN CANDY
WWW.MITIERRACAFE.COM
DEBUG ADS

↶ REPLY  → FORWARD  ⤷ REPLY BY CHAT TO STEVEN

«BACK TO "1-ME" | REMOVE LABEL "1-ME" | REPORT SPAM | DELETE | IMPORTANT | NOT IMPORTANT | MOVE TO ▼ | LABELS ▼ | MORE ACTIONS ▼ | 1 OF 9544 OLDER ›

SYSTEM AND METHOD FOR TARGETING INFORMATION BASED ON MESSAGE CONTENT IN A REPLY

CROSS-REFERENCE TO RELATED APPLICATIONS

This application is a continuation of U.S. patent application Ser. No. 13/954,073, filed Jul. 30, 2013, which is a continuation of U.S. patent application Ser. No. 12/875,621, filed Sep. 3, 2010, which claims priority to U.S. Provisional Application Ser. No. 61/240,163, filed Sep. 4, 2009, the entire contents of each of which are incorporated herein by reference.

TECHNICAL FIELD

This document generally relates to communication systems.

BACKGROUND

Users rely on interconnected systems to access information. For example, a user may access an Internet mail system through a web browser and exchange communications through a HTML ("Hypertext Markup Language") interface.

BRIEF DESCRIPTION OF THE DRAWINGS

FIGS. 13A-13C are exemplary screenshots of an email message including an address as well as links associated with the address and information corresponding to the address in accordance with some implementations.

FIGS. 14A-14D are exemplary screenshots of an itinerary message including a city name as well as links associated with the city name and information corresponding to the city name in accordance with some implementations.

FIGS. 15A-15B are exemplary screenshots of an email message including a product name as well as links associated with the product name and information corresponding to the product name in accordance with some implementations.

FIG. 28 is a screen shot of a sent message that displays matching content embedded between the sent message and the communication.

FIG. 29 is a screen shot of a sent message that does not display matching content embedded between the sent message and the communication as a result of determining that the quality of the matching content is below a threshold.

DETAILED DESCRIPTION

Figure 1:
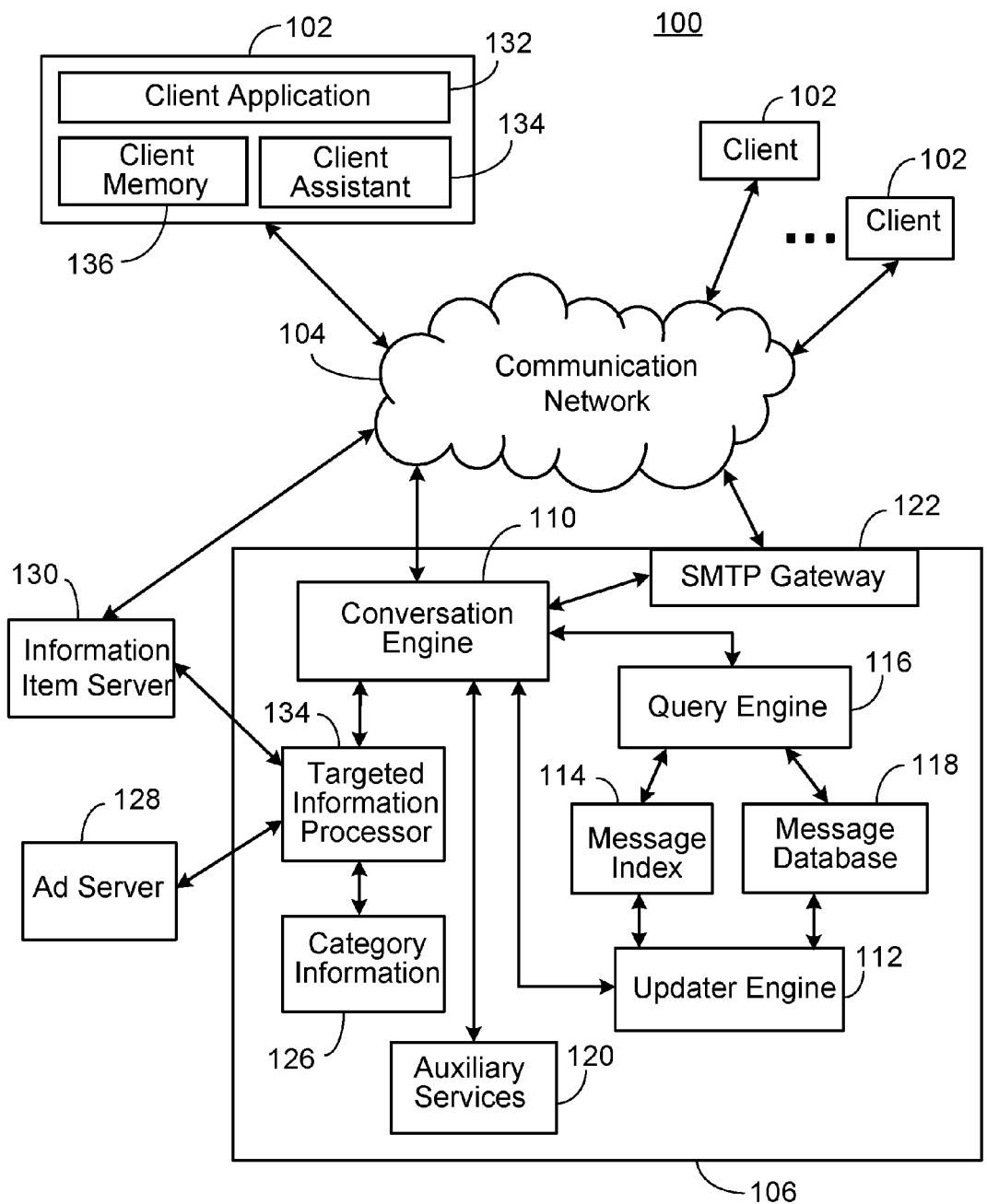
FIG. 1 is a block diagram of an exemplary environment that generates targeted information based on message content in accordance with some implementations.

Users can spend a great deal of time navigating communications networks. Trying to find the "right" information across the libraries of information available on communications networks, such as the Internet, may consume a large portion of a user's limited time and result in a less than desired outcome or experience. An online service provider, such as Google, may increase the value of its services by finding ways to present relevant content responsive to a user's timely interest. More precisely, an online service provider can minimize the time and energy that a user spends trying to locate relevant content that is responsive to the user's predicted interest.

For example, a first user may rely on a web-based messaging system (e.g., Google's Gmail) to exchange electronic mail messages with a second user. The first user may send a message to the second user indicating that the first user will be visiting Menlo Park next week for a business trip. The second user may respond in a reply message to the first user by asking if the first user would care to meet over dinner. The messaging system may analyze the message that is sent and identify matching content that is responsive to interests and subject matter identified within the reply message that was sent. In one instance, the messaging system identifies an advertisement for a restaurant as matching content. The advertisement may reflect available reservations for the dates and times listed in the reply message that was sent. Upon sending the reply message, a display in the web-based messaging system may be dynamically updated to display a conversation tab indicating that the current display represents a conversation view with the first user. The conversation tab may be followed with matching content, i.e., an online advertisement for the restaurant, that was identified based on content that appeared in the sent message. As a result of the web-based messaging system presenting content in an intelligent manner, a burden on the users may be eased because users are not required to identify suitable dining establishments.

A method of presenting information to a party through a messaging application is described. Responsive to receipt of a communication from a party (e.g., the first user), a reply is sent. The communication and the reply is presented in an interface to the sender of the reply. The messaging system determines matching content that is relevant to one or both of the communication and the reply and determines a quality of the match. Determining the quality of the match may include determining a score for an advertisement based on the advertisement's responsiveness to content identified in the reply message that was sent. Based on a determination that the quality is above a threshold, the matching content is presented to the sender of the reply along with the communication and the reply.

A method of presenting information to a party through a grouping of messages is described. Responsive to receipt of a communication in a grouping, a reply is drafted. The communication and the draft reply is presented in the grouping to the party. Upon sending the reply, the messaging system determines matching content that is relevant to one or both of the communication and the reply and determines a quality of the match. Determining the quality of the match may include determining a score for an advertisement based on the advertisement's responsiveness to content identified in the reply message that was sent. Based on a determination that the quality is above a threshold, the matching content is presented to the sender of the reply in the grouping of messages with the communication and the reply. The matching content may be presented between the communication and the reply. The matching content may be presented as a snippet in the group of messages. The matching content may be presented using a distinct color or format to distinguish it from the messages in the group of messages.

FIG. 1 is a block diagram of a system 100 for implementing some implementations. One or more clients 102 can be connected to a communication network 104. The communication network 104 can be connected to an information service 106. The information service 106 can include a conversation engine 110, an updater engine 112, a message index 114, a query engine 116, a message database 118, one or more auxiliary services servers 120, an SMTP gateway 122, a targeted information processor 124, category information 126. The targeted information processor 124 can be connected to an ad server 128 and one or more information item servers 130.

The client 102 can be any of a number of devices (e.g., a computer, an internet kiosk, a personal digital assistant, a cell phone, a gaming device, a desktop computer, or a laptop computer) and can include a client application 132, a client assistant 134, and/or client memory 136. The client application 132 can be a software application that permits a user to interact with the client 102 and/or network resources to perform one or more tasks. For example, the client application 132 can be a browser (e.g., Firefox) or other type of application that permits a user to search for, browse, and/or use resources (e.g., web pages and web services) on the client 102 and/or accessible via the communication network 104. The client assistant 134 can perform one or more tasks related to monitoring a user's activities with respect to the client application 132 and/or other applications, searching or browsing for resources (e.g., files) on the client 102, and processing information received from or being sent to information service 106. The client assistant 134 can be part of the client application 132, available as a plug-in to the client application 132 (provided, for example, from various on-line sources), or provided as a stand-alone program. The client assistant can be a web-based messaging application such as the client executable portion of the Google Gmail product. A client memory 136 can store system information and information about a user, among other things.

The communication network 104 can be any local area network (LAN) and/or wide area network (WAN), such as an intranet, an extranet, or the Internet. It is sufficient that the communication network 104 provides communication capability between the clients 102 and the information service 106. In some implementations, the communication network 104 uses the HyperText Transport Protocol (HTTP) to transport information using the Transmission Control Protocol/Internet Protocol (TCP/IP). The HTTP permits client computers to access various resources available via the communication network 104. The various implementations, however, are not limited to the use of any particular protocol. The term "resource" as used throughout this specification refers to any piece of information or service that is accessible via a Uniform Resource Locator (URL) and can be, for example, a web page, a document, an email message, an Instant Messaging (IM) message, a Short Message Service (SMS) message, a transcribed voice message, a database, an image, or a computational object.

The conversation engine 110 can respond to a variety of requests from the client assistant 134 related to messages and return conversation-based responses via its connection with the communication network 104. A conversation can include one or more relevant messages relating to a conversation topic. Various criteria can be used to determine which messages are part of each distinct conversation. For example, an analysis can be made of the contents of messages received and/or sent by a user. Messages whose contents are found to be related can be grouped together. In another example, a thread identifier found in a message header can also be used to identify related messages. In a further example, a subject line in the message header can be used to identify related messages. The senders and recipients of the messages are participants in the conversation. All messages directed to a user of the information service 106 can be grouped into a plurality of conversations and presented to the user in a conversation-based format, individually or jointly. In a conversation list view, a user can see in a summary form a list of conversations in which the user participates. In a conversation view, the user can see in an expanded form one or more of messages associated with a particular conversation.

The information service 106 can create a snippet of a conversation or a message. A snippet provides a user with a preview of the contents of the conversation or message without the user having to open the conversation or the message. In a list of conversations, the snippet can be generated from the most recent message in the conversation. The snippet can also be extracted from the first message (i.e., the oldest message) in the conversation. The snippet can also be extracted from all the messages in the conversation according to predefined heuristic rules, e.g., listing a set of keywords appearing most frequently in the conversation. If the information service 106 is preparing a list of conversations in response to a search submitted by a user, the information service 106 can create a snippet for each conversation in the list, or for each conversation in a displayed portion of the list, the snippet including a portion of the conversation that matches user submitted query terms. These snippets may be similar in one or more respects to snippets included in search results returned by a search engine, such as the Google search engine. In a conversation view, a snippet can be generated for one or more messages in the conversation.

The SMTP gateway 122 is also connected to the communication network 104. The SMTP gateway 122 can be directly involved in receiving and sending messages between the information service 106 and other email systems, messaging systems or information services. In some implementations, the SMTP gateway 122, for example, transmits and receives messages using the simple mail transfer protocol (SMTP). The SMTP gateway 122 can receive a new message from the communication network 104 and send the message to conversation engine 110 for additional processing. Additionally, the SMTP gateway 122 can receive messages from the conversation engine 110 and then transmit (via the communication network 104) those messages to recipient addresses specified in the messages.

The one or more auxiliary services servers 120 can provide additional services to the conversation engine 110. The auxiliary services servers 120 can, for example, include a spam detection module for detecting and processing spam and/or an attachment management module for managing the storage and retrieval of documents or other files attached to messages.

As mentioned above, the conversation engine 110 can be connected to the targeted information processor 124. The targeted information processor 124 can provide targeted information for display to a user at client 102. The targeted information processor 124 can provide, for example, advertisements and/or other information items related to content (e.g., messages or conversations) being provided to the client assistant 134. The targeted information processor 124 can be connected to category information 126 which is used by the targeted information processor 124 to identify various categories as described below. The category information can be used to obtain, for example, category-related advertisements and/or other information. Category-related advertisements can be obtained, for example, from ad server 128. Category-related other information can be obtained, for example, from information item server 130.

FIG. 1 is exemplary. In some implementations, the information service 106 includes a subset or superset of those elements illustrated in the figure. Although FIG. 1 shows the information service 106 as a number of discrete items, this figure is intended more as a functional description of the various features which may be present in the information service 106 than as a structural schematic of the various implementations. In practice, and as recognized by those of ordinary skill in the art, items shown separately could be combined and some items could be further divided into sub-elements or parallel elements. For example, some separate elements in the figure could be implemented by a single server and some single items could be implemented by one or more servers or modules. The actual number of servers in information service 106 and how features are allocated among the servers will vary from one implementation to another, and may depend in part on the amount of traffic that the system may handle during peak usage periods as well as during average usage periods. For example, the message database 118 can be implemented using a plurality of servers if the information service 106 manages a large volume of messages associated with a large number of user accounts.

As mentioned above, the client 102 can include a client application 132 and client assistant 134. Client application 132 can provide a window to be displayed on a displaying device (e.g., a monitor) for rendering conversations associated with a particular user. The conversations and messages in the conversations can be encoded using HyperText Markup Language (HTML), XML, or any other appropriate markup language or encoding scheme, and then rendered by the client application 132. When a user submits a request through client application 132 to the information service 106 to access messages stored in the user's account, the information service 106 identifies conversations in the user's account in accordance with the user's request and transfers them as well as a set of display instructions back to the client 102. Client assistant 134 can, in response, generate one or more forms in accordance with the display instructions, where each form can include information of some of the conversations. The forms can then be submitted to and rendered by client application 132. In some implementations, client assistant 134 may alternatively exist and operate in the information service 106.

The information service 106 and the client assistant 134 work in concert to allow a user to view, compose, send and/or search messages in a user's message account and to present the search results in a highly intuitive fashion. The information service 106 extracts information from a user's message account by processing messages received, sent and/or being composed by the user, and the client assistant 134 assists in rendering the information prepared by the information service 106. In some implementations a different division of duties between the information service 106 and the client assistant 134 can be implemented. Because many of the tasks performed by the system can be performed by either the information service 106 or the client assistant 134 or by the two working together, these two components are sometimes herein referred to jointly as the "conversation system".

The conversation system can provide at least two different views including a conversation list view and a conversation view as mentioned briefly above. In a conversation list view, a plurality of conversations can be displayed where each conversation can be displayed in a summary form. For example, each conversation can be represented by a number of conversation elements. The conversation elements can include one or more of: a number indicating the number of messages in the conversation, a list of one or more of the identifiers or names of the senders of messages in the conversation, a conversation description (e.g., a subject line of the message), a date/time value of the conversation (e.g., a date/time value of the last received message in the conversation), and a snippet from one or more of the messages in the conversation. In some implementations, each conversation can be represented as a single row in the conversation list view.

In a conversation view, one or more messages from a conversation can be displayed. Each message can be displayed in one of a number of various modes, for example an expanded mode, a compacted mode, or a compressed mode. In an expanded mode, the body of the message can be displayed along with, for example, header information including names or other identifiers of the sender and the recipients of the message, a date/time value indicative of when the message is received or sent, routing information, and other properties of the message. An expanded mode can be used, for example, for messages which are marked as "unread." In a compacted mode, the message body can be hidden and a snippet from the message is provided in its place. The snippet can be chosen to occupy less space than the body. For example, a snippet can be chosen to occupy only one line in a display window. The compacted mode can be used for messages which have been read or marked as read. The compacted mode allows messages in a conversation view to be displayed within the same window more densely than if the expanded mode were used. In a compressed mode, a message can be represented with a small bar. The small bar can contain no message information. The visual effect of such a mode can be that multiple compressed messages appear like the edges of cards in a deck of cards. A user can toggle between the various display modes by selecting a message or using various controls in the display window. It should be understood that the techniques described in this specification with reference to a conversation (as might be found in the Google Gmail product) can be equally used with any message system (e.g., Outlook or Thunderbird) where messages can be displayed in various views (and can include portions of messages) such as a message view or a thread view where related messages can be displayed.

In some implementations, when a conversation is being displayed in the conversation view, additional, targeted information (sometimes herein called "informational items") can be displayed in the display window. For example, one or more advertisements relevant to, or related to, one or more of the messages in the conversation can be displayed. In another example, one or more other types of information can be displayed (e.g., direct information, links to information, tools for presenting information). Such other information can include, but is not limited to news items or links to news items, maps or map links, phone numbers, links to product information, stock prices or links to stock prices, links to weather forecasts, web page links, dictionary entries or links to dictionary entries, images or links to images, RSS feeds or links to RSS feeds, links to blog (web log) events, links to user polls, links to files or other content on the client 102, and other types of information. Targeted information can include other items including actively executing items. The targeted information can take the form of a distinct region in the conversation, a snippet, a message, or a snippet expandable to a message. The targeted information can be distinguished from messages based on a variation in color, borders, font, or other variations in format.

RSS feeds can be content distributed from various sources on a network (e.g., the Internet). RDF Site Summary (RSS) (and sometimes, Real Simple Syndication) is an XML-based lightweight multipurpose extensible metadata description and syndication format. RSS is typically used for distributing various types of content to a number of receivers simultaneously. News items can be news items from one or more sources. Blog events can be events generated from one or more web logs (blogs). User polls can be polls that the user may participate in which may come from a variety of sources. Stock prices can be stock prices of companies whose names or stock ticker symbols are mentioned in the conversation. Weather forecasts can be weather forecasts of locations like cities or states whose names are directly or indirectly referred to by a message in the conversation.

Multiple factors affect the relevancy of an information item to a user of the information service. For instance, the relevancy of the information item to a user in many ways depends on the contents of the input associated with the user. Generally, when an advertising service returns advertisements based on text input, the more closely aligned the text input is with a concept or category that is also associated with the returned advertisements, the more relevant the returned advertisements are likely to be to the user. In some types of messages, certain terms or word phrases are frequently found, but may not be useful in obtaining relevant advertisements. For example, an electronic message from an online store notifying a customer that the product he or she ordered has been shipped might include, among other things, the product name and phrases such as "order has shipped", "left the warehouse", or "international air". An advertising service receiving as input the entire message text including both the product name and one or more of these boilerplate-type phrases might inadvertently return advertisements related to shipping, warehouses, or international shipping. These advertisements, although relevant to the phrases, are probably of little interest to the customer, who is more interested in the product.

Figure 2:
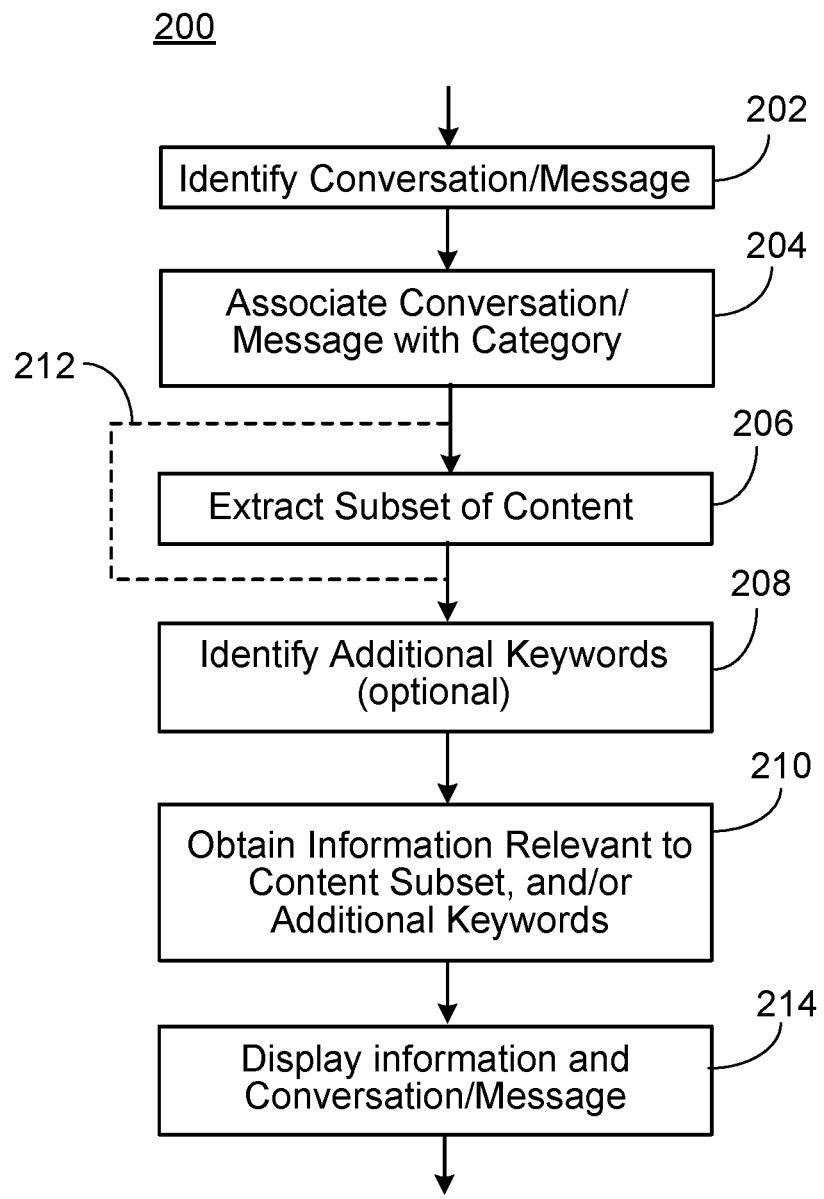
FIG. 2 is a flow diagram of a process for generating targeted information based on message content in accordance with some implementations.

FIG. 2 illustrates a process by which targeted information can be generated for one or more messages according to some implementations. Initially, a conversation is identified (202). For example, a conversation may be identified when a user selects a conversation to be displayed. As mentioned above, a conversation can include one or more related messages. The identification at 202 can identify all of the messages in a conversation or selected messages in a conversation. Various criteria can be used when identifying selected messages in a conversation. For example, messages can be identified based on the display mode of a message (e.g., identified messages are messages which are being displayed in an expanded mode). In another example, messages can be identified based on a time factor of a message within a conversation (e.g., the most recently received message is identified). Although the following discussion assumes that all the messages in a conversation have been identified, the same techniques can be used when less than all the messages are identified. In some embodiments, privacy protections are employed to anonymize personally identifiable information and/or sensitive information or topics and restrict or limit such content or topics from being used in the selection of targeted information.

The identified conversation can then be associated with one or more categories (204). Some examples of categories include, but are not limited to, online shopping, shipping, travel, entertainment, dining, online auctions, health/beauty, taxes, real estate, computer software and hardware, and mortgages. More generally, the categories associated with conversations can include categories of things, activities, processes, concepts and the like. Some conversations may not be related to any category. In some instances a conversation can, therefore, have no associated category. After determining that a conversation belongs to one or more categories, a subset of the content of the conversation can then be extracted (206). The content of a conversation from which a subset can be extracted can include one or more of the following: a conversation description (e.g., a subject line of the message), one or more message bodies, a message sender domain, a message sender, a conversation label, one or more message labels, one or more message recipients, other message information, or information related to a conversation. What is extracted from a conversation into the subset can be dependent on a category identification. The portions of a conversation that may be extracted may be limited by privacy protection and anonymization filters to prevent, restrict, reduce or limit, for example, personally identifiable information from being used in the targeting of advertising. For example, all or some of the message sender, message recipient, message domains, and header/routing information may be filtered out before targeting. The extraction can aid in obtaining information relevant to a conversation by, for example, excluding from the subset content elements in the conversation which may cause information not relevant to the pertinent portions of message to be returned from an information service (e.g., an advertisement service). Generally speaking, a content element is one or more terms, such as a word or word phrase.

In some implementations, one or more additional keywords can be identified (208), which can be added to the subset prior to the subset being used to obtain relevant information. These additional keywords, which can be dependent on a category identification, can increase a desired relevancy of the information returned from an information service. For example, a "travel" category can be identified for an airline itinerary message to a consumer. Furthermore, when the travel category is so identified, it can be useful to add travel related keywords, such as "hotel" and "car rental", when forwarding extracted content to an information service. Accordingly, the additional keywords can be content elements that are related to a category but may not be present in a message associated with the category.

The content in the conversation can be used to determine which additional keywords are added. For example, an airline itinerary message to a consumer for an international flight may have "passport" and related, additional keywords added to the content sent to the information service, whereas an airline itinerary message for a domestic flight may not, even though both can be identified as associated with the travel category. As another example, in a flight itinerary, the destination of a flight can be determined (e.g., by identifying or decoding a city, airport or other location code) and the name of the destination can be added to the subset.

Information relevant to the extracted content is then obtained (210) from one or more information services (e.g., ad server 128 and/or information item server 130). The input provided to the information services can include one or more additional keywords identified at 208. In some implementations (as represented by the dashed line at 212 in FIG. 2), additional keywords can be used in place of content extracted from a conversation.

The information obtained from the information services can be displayed with the conversation (214). When the display is on a client 102, the information service 106 can provide formatting information directing the simultaneous display of the information and the conversation in one or more transmissions to the client 102.

Figure 3:
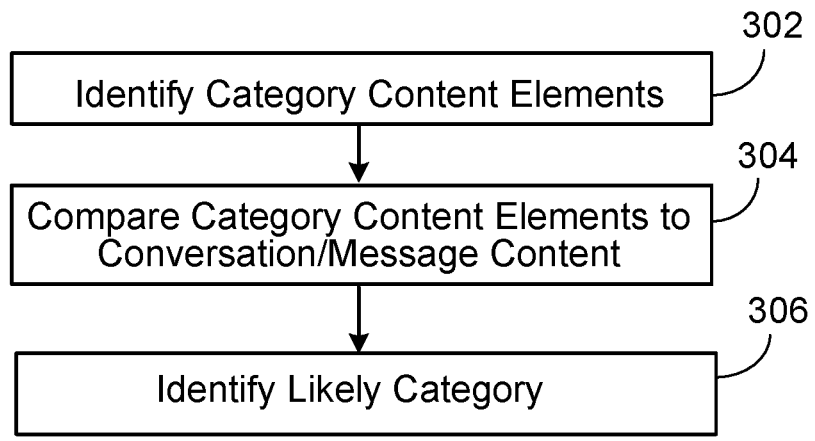
FIG. 3 is a flow diagram of a process for identifying a category for message content in accordance with some implementations.

FIG. 3 illustrates an exemplary process for associating a conversation with a category according to some implementations. Initially, category content elements can be identified (302). Category content elements can be organized into lists of content elements, where each list can be associated with a category. As mentioned earlier, each content element can comprise one or more terms. Broadly speaking, a category list for a category can comprise those content elements which are associated with that category. When the number of content elements associated with a particular category are included in a conversation has reached a threshold, then it is more likely than not that the conversation belongs to that particular category. In another implementation, when the percentage of content in a conversation which is associated with a particular category has reached a threshold, then that conversation belongs to the category. However, a conversation can potentially include content elements from more than one category. Certain metrics can be used to distinguish a most likely category from among categories that have some of their content elements present in a conversation. Returning to FIG. 3, the conversation content can be compared against the category content elements (304) and the most likely category can be identified (306). The content of a conversation that can be compared to the category lists can be one or more of a conversation description such as the message subject, one or more message bodies, a message sender domain, a message sender, a conversation label, one or more message labels, one or more message recipients, other message information, or information related to a conversation.

Category lists can be compared against a conversation content in a number of ways. For example, the number of times a particular content element from a category list appears in a conversation can be identified. In another example, each of the category lists and the conversation can be treated as a vector of terms and a comparison of a category list to the conversation can be a vector distance. When a conversation has messages that can include the content of a previous message (e.g., as might be found in a reply message), that previous content can be ignored. The most likely category to which a conversation belongs can also be determined in a number of ways. For example, a category having the most number of unique content elements present in the conversation can be identified as the most likely category. As another example, a category that has the highest ratio of the number of content elements which belong to that category as compared to the total number of content elements present in the conversation can be identified as the most likely category. If no content elements from any category content element list are present in the conversation, or if no metrics for any category are greater than a threshold (e.g., the number of unique content elements associated with a category list present in the conversation does not exceed a threshold), the conversation can be associated with no category.

Figure 4:
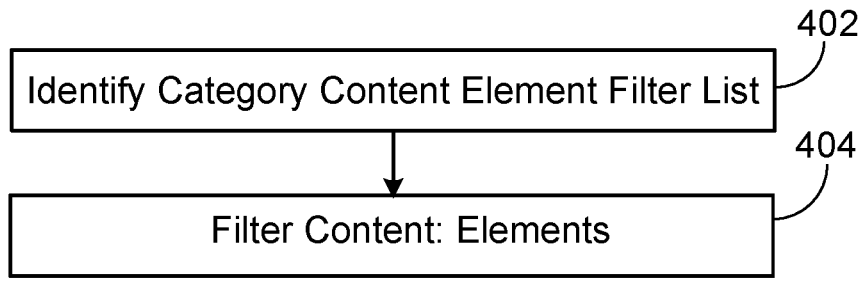
FIG. 4 is a flow diagram of a process for filtering message content in accordance with some implementations.

FIG. 4 illustrates an exemplary process for extracting a subset of the content from a conversation according to some implementations. Initially, a category content element filter list can be identified (402). Each category (or each category in a subset of predefined categories) can have a filter list of content elements associated with it (i.e., a category content element filter list). Each filter list can comprise content elements which are associated with a particular category, but which, if included in the input provided to the information service (e.g., an ad service) may be likely to result in non-relevant information being returned. For example, a filter list for a category of "online shopping" can include the content element "receipt" and/or "your order has shipped". Once the appropriate filter list has been identified, a content subset can be created by filtering those content elements in the list from the conversation (404). Other content elements can also be filtered which may not be directly related to a specific category, but nonetheless may be likely to result in an information service returning information not directly relevant to the conversation. For example, message header information and selected message component identifiers (e.g., "To:") can be filtered from a conversations, regardless of the identified category.

Figure 5:
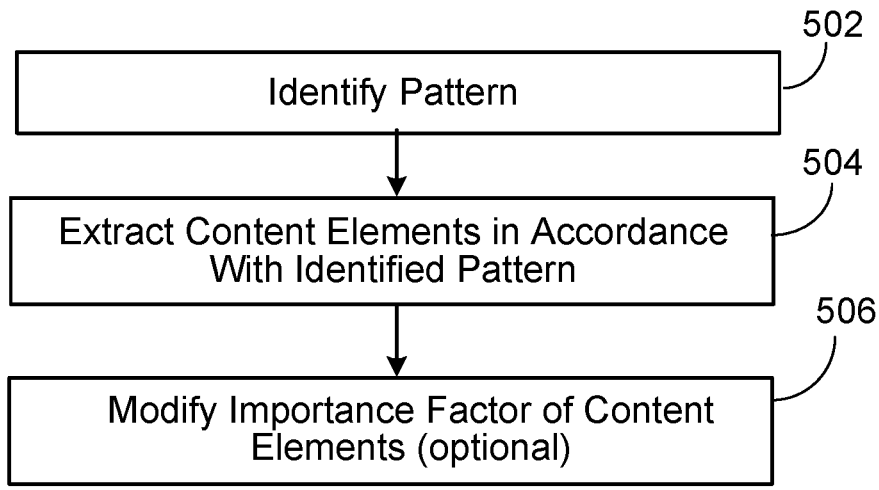
FIG. 5 is a flow diagram of a process for identifying a pattern in message content and boosting the importance of certain content elements in accordance with some implementations.

FIG. 5 illustrates another exemplary process for extracting a subset of the content from a conversation according to some implementations. The process of FIG. 5 can be used alone or in combination with the process of FIG. 4. A conversation can be examined to identify one or more patterns in the conversation (502). Messages from service providers can contain patterns within which can be embedded information specifically related to the service. For example, an automated shipping notification message can include a shipping notification pattern comprising one or more labels and associated text. The labels can be common to many messages, but the associated text is more interesting from an information service point of view. The associated text can include, for example, the name of the product being shipped. In another example, a reservation confirmation message from an online dining reservation system can contain a pattern within which the most relevant information (e.g., the restaurant name) is embedded. In a reservation confirmation message the pattern can include, for example, the following text: "Your reservation is confirmed at". Once the pattern has been identified, the content elements associated with the pattern can be filtered and the remaining content elements extracted to the subset (504).

Optionally, an importance factor associated with one or more extracted content elements can be modified (506). An input to an information service (e.g., ad server) can include information relating to the importance of one or more of the content elements in the input. Based on various criteria, it can be determined that one or more content elements provided in an input to an information server (e.g., an ad server) should be treated differently from other content elements. Accordingly, the output of the information server can be weighted toward those content elements deemed important and/or down-weighted for content elements deemed unimportant. One or more content elements associated with a particular part of a pattern can be accorded importance factors different from other parts of the extracted subset. For example, a content elements associated with a product name can be accorded more weight than other extracted content elements. As another example, a content element identified as a destination shipping address in a receipt for online shopping can be downweighted in importance.

Figure 6:
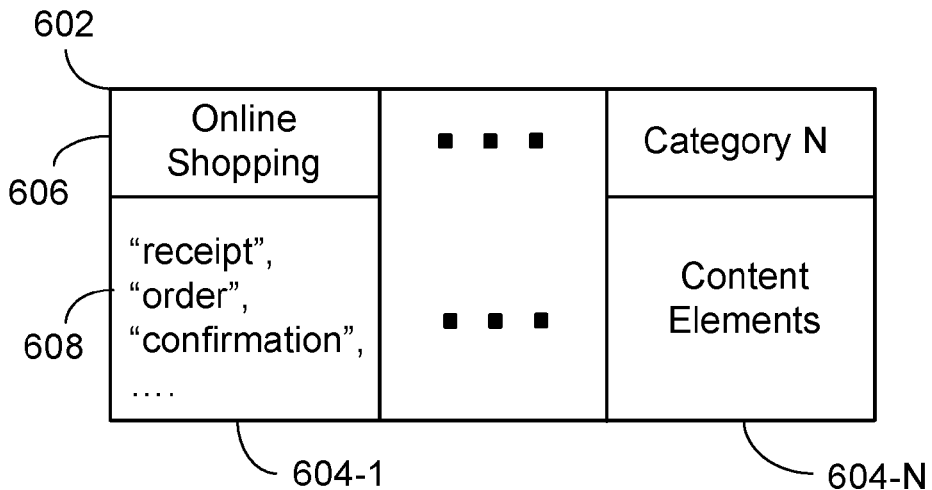
FIG. 6 depicts an exemplary data structure for one or more category lists according to some implementations.

FIG. 6 illustrates an exemplary data structure for storing one or more category lists in accordance with some implementations. Many other data structures, such as tree data structures, may be used to store category list information in other implementations. A category list data structure 602 can include one or more category lists such as category list 604-1 to category list 604-N, where N is the number of predefined categories. Each category list can include a category identifier portion, such as category identifier portion 606, which identifies the category to which the category list is associated. Each category list can also include a content element list portion, such as content element list portion 608, which includes one or more content elements corresponding to the category with which the content element list is associated. The content element list portion 608 provides some exemplary content elements (e.g., "receipt") associated with an online shopping category. The content elements in each category list can be used to identify the category (or categories) to which one or more parts of a conversation belong. As discussed earlier, a conversation can be associated with one or more different categories. A content element can be present in multiple category lists.

Figure 7:
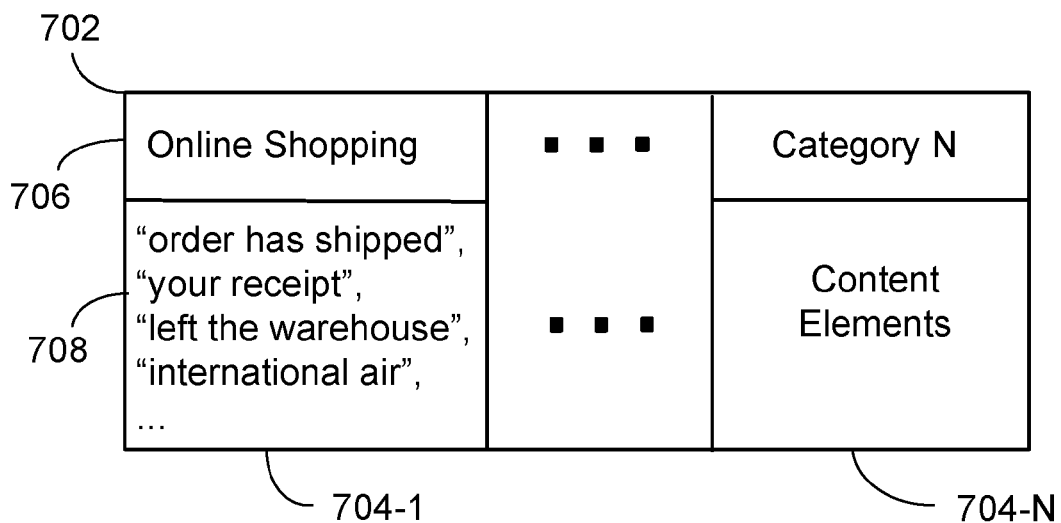
FIG. 7 depicts an exemplary data structure for one or more filter lists according to some implementations.

FIG. 7 illustrates an exemplary data structure for storing one or more filter lists in accordance with some implementations. Many other data structures, such as tree data structures, may be used to store filter list information in other implementations. A filter list data structure 702 can include one or more filter lists such as filter list 704-1 to filter list 704-N, where N is the number of categories. Each filter list can include a category identifier, such as category identifier portion 706, which identifies the category to which the filter list is associated. Each filter list can include a filter list portion, such as filter list portion 708, which includes one or more content elements corresponding to the category with which the filter list is associated. The filter list portion 708 shown in FIG. 7 provides some exemplary content elements (e.g., "order has shipped") associated with an online shopping category. The content elements in each filter list can be used to filter out content elements which might result in an information server return non-relevant information.

FIGS. 6 and 7 each illustrate one of many possible data structures for storing category lists and category filter lists. One of ordinary skill in the art will recognize other ways that the information can be organized to achieve the same result.

Figure 8:
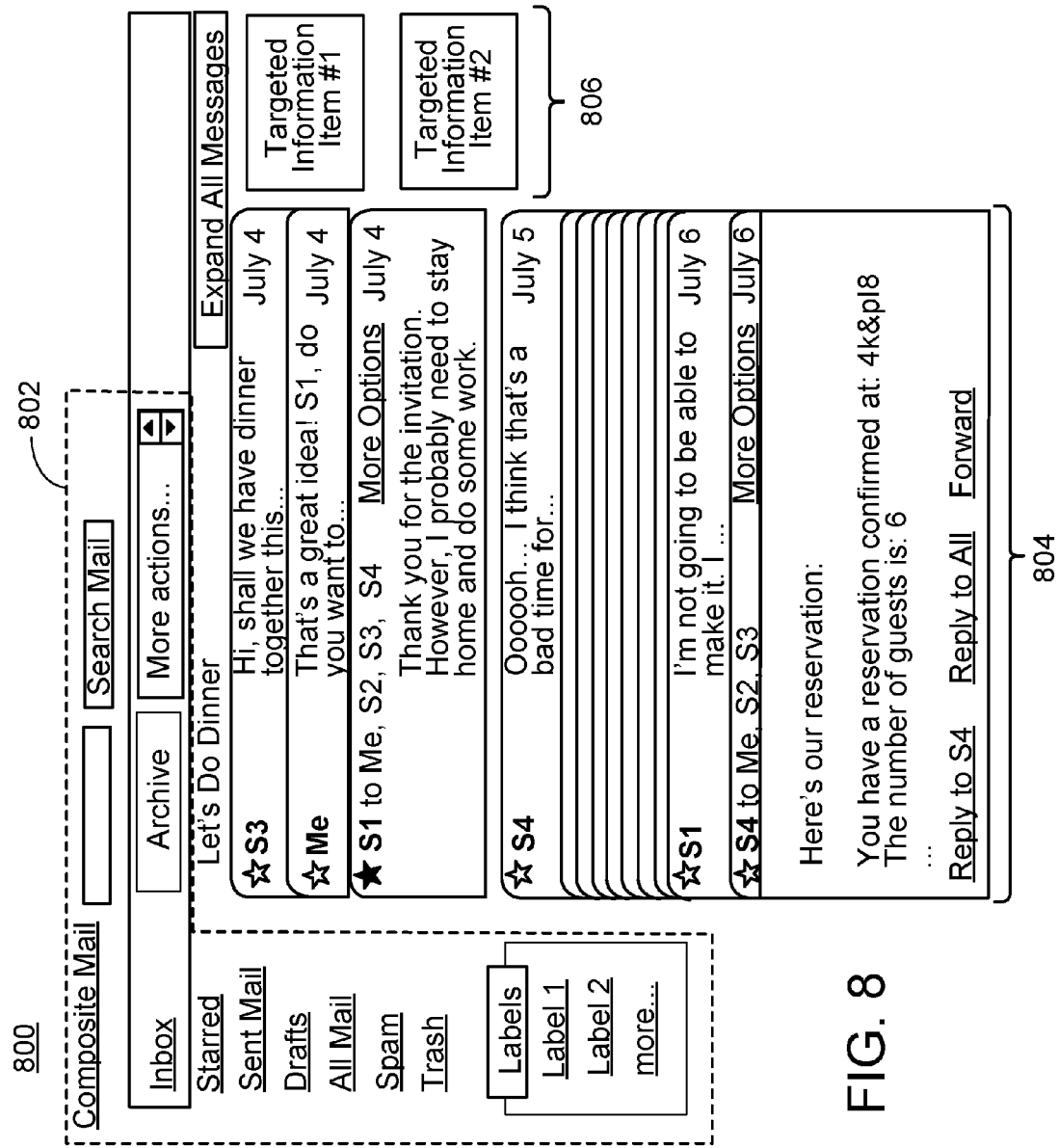
FIG. 8 illustrates an exemplary screenshot of a conversation and targeted information in accordance with some implementations.

FIG. 8 provides an exemplary screenshot of a display with a conversation and targeted information items in accordance with some implementations. FIG. 8 provides one exemplary display organization for illustration purposes only and does not serve to limit the ways conversations and targeted information items can be displayed. The display area 800 can include 3 major display portions: a navigation and control portion 802, a message portion 804, and a targeted information item portion 806. The navigation and control portion 802 can include one or more navigation and/or control items (e.g., "compose email"). The message portion 804 can include a conversation description and one or more messages associated with a conversation. The targeted information item portion 806 can include one or more information items which have been obtained as a result of the techniques described above. For example, the information items may be obtained from an ad server 128 and/or information item server 130 (FIG. 1). Although FIG. 8 shows two information items, the number of information items displayed may be smaller or larger, and may vary from one conversation to another or from one information view (e.g., view conversation list) to another (e.g., view selected conversation). FIG. 8 illustrates only one exemplary layout configuration and other layouts are possible. For example, the relative position of the display areas to each other may change (e.g., the targeted information item portion 806 can be displayed to the left, right, bottom, or top relative to the message portion 804).

Figure 9:
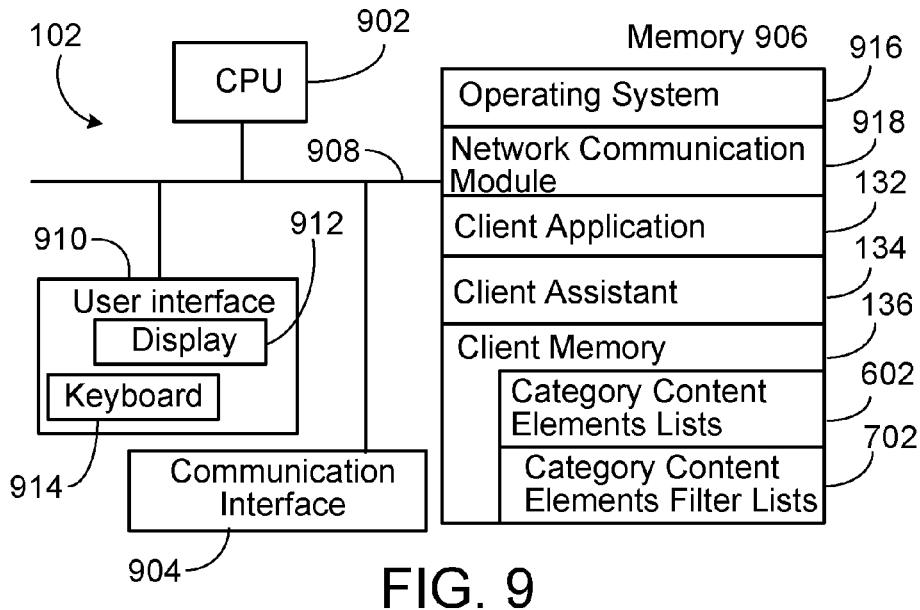
FIG. 9 is a block diagram of an exemplary client in accordance with some implementations.

FIG. 9 is a block diagram illustrating an example structure for a client 102. The client 102 typically includes one or more processing units (CPUs) 902, one or more network or other communications interfaces 904, a memory 906, and one or more communication buses 908 for interconnecting these components. The client 102 optionally may include a user interface 910 comprising a display device 912 and a keyboard 914. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 may optionally include one or more storage devices remotely located from the CPU(s) 902. In some implementations, the memory 906 stores the following programs, modules and data structures, or a subset thereof:

- an operating system 916 that includes procedures for handling various basic system services and for performing hardware dependent tasks;
- a network communication module 918 that is used for connecting the client 102 to other computers via the one or more communication network interfaces 904 and one or more communication networks, such as the Internet, other wide area networks, local area networks, metropolitan area networks, and so on;
- a client application 132 that can permit a user to interact with the client 102 as described above;
- a client assistant 134 that can perform one or more tasks as described above; and
- a client memory 136 that can optionally include category list data structure 602 and filter list structure 702, examples of which are described above.

Figure 10:
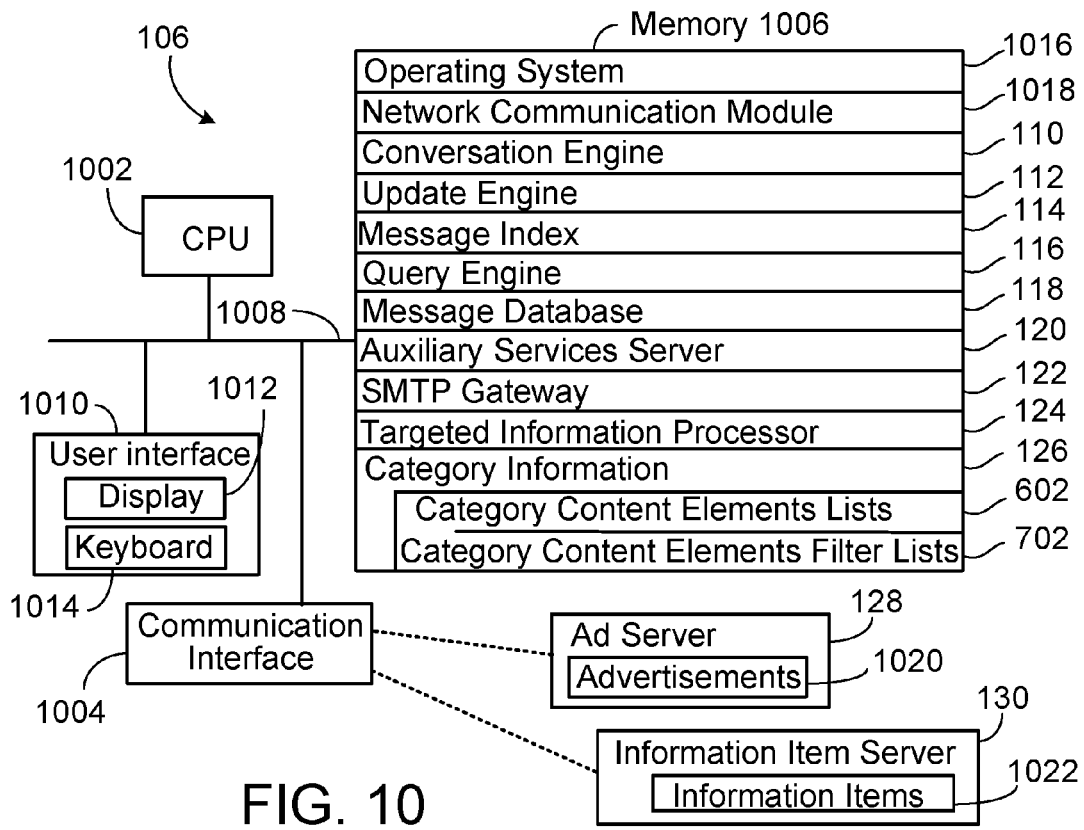
FIG. 10 is a block diagram of an exemplary information server in accordance with some implementations.

FIG. 10 is a block diagram illustrating an example structure for an information service 106. The information service 106 typically includes one or more processing units (CPUs) 1002, one or more network or other communications interfaces 1004, a memory 1006, and one or more communication buses 1008 for interconnecting these components. The information service 106 optionally may include a user interface 1010 comprising a display device 1012 and a keyboard 1014. The memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1006 may optionally include one or more storage devices remotely located from the CPU(s) 1002. In some implementations, the memory 1006 stores the following programs, modules and data structures, or a subset thereof:

- an operating system 1016 that includes procedures for handling various basic system services and for performing hardware dependent tasks;
- a network communication module 1018 that is used for connecting the information service 106 to other computers via the one or more communication network interfaces 1004 and one or more communication networks, such as the Internet, other wide area networks, local area networks, metropolitan area networks, and so on;
- a targeted information processor 124 for obtaining targeted information for a conversation as described above; and
- category information 126 that can include category list data structure 602 and filter list structure 702, examples of which are described above.

In some implementations, the information service 106 includes the following elements, or a subset or superset of such elements: a conversation engine 110 for responding to a variety of requests from the client assistant 134 returning conversation-based responses; an updater engine 112 for updating a message database 118; a message index 114 containing index information for messages in the message database 118; a query engine 116 for performing various queries using the message index 114 and message database 118; an auxiliary services server 120 for performing various auxiliary services; and an SMTP gateway 122 for sending and receiving messages.

The information service 106 can be connected to ad server 128 and/or information item server 130 via the communication interface 1004. Ad server 128 can contain one or more advertisements 1020. The ad server 128 can receive input and return advertisements that can be relevant to the input. The information item server 130 can include one or more information items 1022. Similar to the ad server 128, the information server 130 can receive input and return informational items that can be relevant to the input.

Each of the above identified elements in FIGS. 9 and 10 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 906 may store a subset of the modules and data structures identified above. Furthermore, the memory 906 may store additional modules and data structures not described above.

Although FIGS. 9 and 10 show, respectively a client 102 and an information service 106, the figures are intended more as functional descriptions of the various features which may be present in a client and set of servers than as a structural schematic of the implementations described herein. In practice, and as recognized by those of ordinary skill in the art, items shown separately could be combined and some items could be separated. For example, some items shown separately in FIG. 10 could be implemented on single servers and single items could be implemented by one or more servers. The actual number of servers used to implement an information service 106 and how features are allocated among them will vary from one implementation to another, and may depend in part on the amount of data traffic that the system may handle during peak usage periods as well as during average usage periods.

Targeting Information Based on Identified Information Entities in Message Content As mentioned in the background section, an electronic document often includes one or more information entities that a reader may take further actions upon them while reading the document. For example, the electronic document may be an email message that includes a new address of his or her friend who has recently relocated to a different city. The reader may prefer to include the new address in his or her address book immediately. Sometimes, he or she may want to obtain the driving directions to the new address. Conventionally, the reader manually copies and pastes the new address into the address book. This is tedious and error-prone.

The following discussion is devoted to an alternative implementation. According to this implementation, before serving an electronic document to a requesting user, the electronic document and a set of predetermined information entity types are first submitted to an information entity server. The server is responsible for extracting from the document information entities matching the predetermined information entity types. Next, the information entity server submits to one or more information item servers (e.g., ad server, map server, and weather forecast server, etc) requests corresponding to the extracted information entities to retrieve relevant information that might be of interest to the user. Finally, the relevant information and/or links to some of the relevant information are served to the requesting user together with the requested electronic document. For illustrative purposes, an email message is used as an exemplary document in the following discussion. But one skilled in the art will appreciate that the same techniques can be applied to other types of electronic documents such as web pages, documents, Instant Messaging (IM) messages, Short Message Service (SMS) messages, transcribed voice messages, and any combination thereof.

Figure 11:
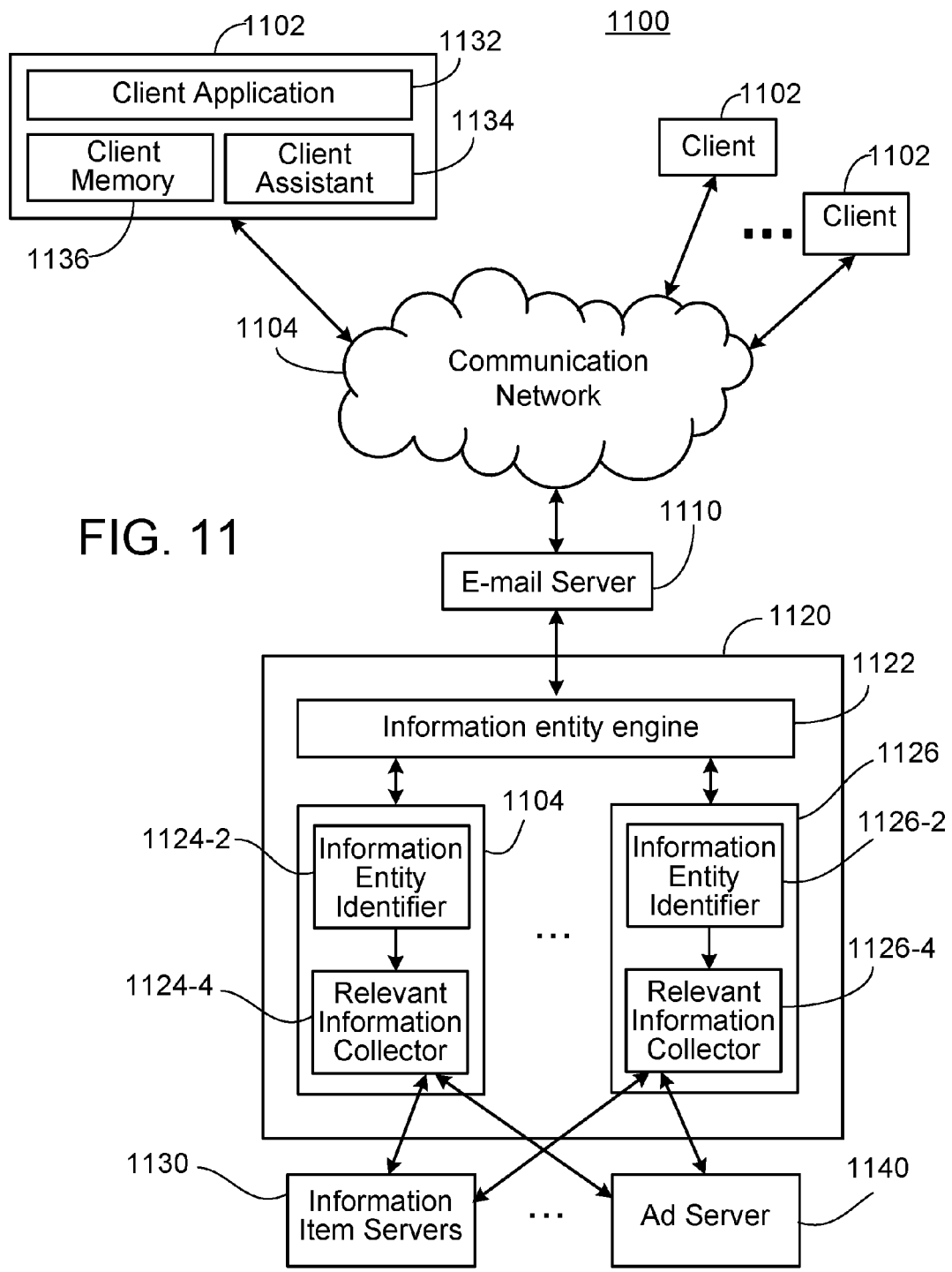
FIG. 11 is a block diagram of an exemplary system that generates targeted information based on information entities identified in message content in accordance with some implementations.

FIG. 11 is a block diagram of an exemplary system 1100 that generates targeted information based on information entities identified in message content in accordance with some implementations. Note that the client and network aspects of system 1100 in FIG. 11 are similar to those aspects of system 100 in FIG. 11. Therefore, the following discussion primarily concerns the server portion of system 1100.

The communication network 1104 is connected to an email server 1110 on the server side. In some implementations, the email server 1110 may have a structure similar to the information service 106 shown in FIG. 1. The email server 1110 is connected to an information entity server 1120. In some cases, the information entity server 1120 and the email server 1110 may co-exist on the same computer server. In some other cases, they may operate from different computer servers.

The information entity server 1120 includes an information entity engine 1122 that receives requests from and sends responses to the email server 1110. Within the information entity server 1120, there are one or more information entity modules (1124, 1126). Each module is responsible for identifying one or more information entities and collecting information related to the information entities from other sources. Generally speaking, these modules operate independently from each other in any order. In some implementations, however, one module's operation may depend on the information entities identified by another module or modules. In such implementations, the information entity engine 1122 is configured to sequentially execute the modules in an order consistent with the dependencies of one or more of the modules on the prior execution of other ones of the modules.

An information entity module (1124, 1126) may further include sub-modules: an information entity identifier (1124-2, 1126-2) and a relevant information collector (1124-4, 1126-4). The information entity identifier (1124-2, 1126-2) is responsible for identifying any occurrences of an information entity type in an email message content and then forwarding the identified information entities to the relevant information collector (1124-4, 1126-4). For each identified entity, the corresponding information collector (1124-4, 1126-4) makes an optional information request to one or more backend information item servers 1130 and/or advertisement servers 1140 to collect information items that are deemed relevant to the identified information entity.

In some implementations, unless there are specified dependencies between different modules, the information entity modules process the content of a message (or a set of message) in an arbitrary order, or in parallel. Requests to backend information item servers 1130, 1140 may be made in parallel (e.g. during overlapping time periods), by the modules. In other implementations requests to backend information item servers 1130, 1140 are made sequentially by the modules 1124, 1126, in same order that the modules are process the content of a message. After receiving responses to the backend requests, the modules associate the collected information items with the corresponding information entities and return the collected information items to the information entity engine 1122. The information entity engine 1122 compiles the responses from the different modules and generates an ultimate response to the email server 1110.

Figure 12:
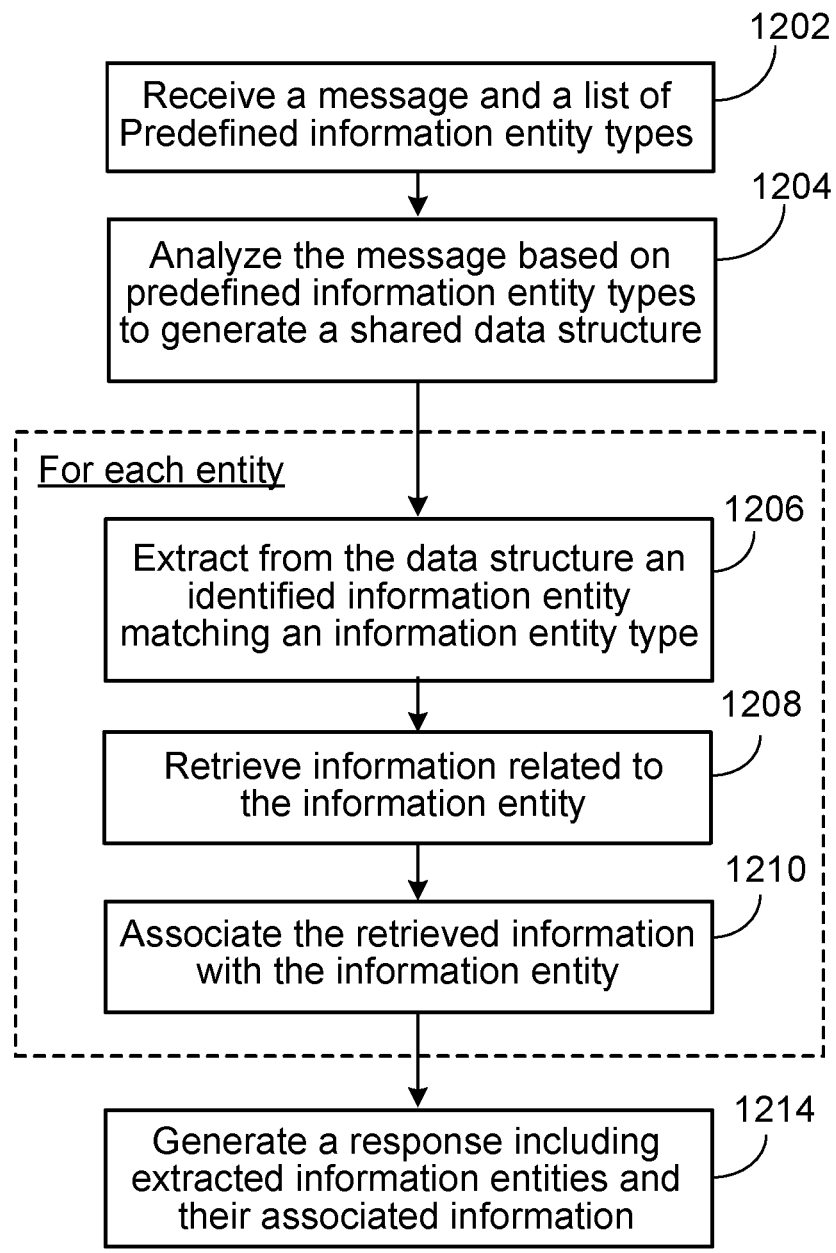
FIG. 12 is a flow diagram of a process for identifying in message content one or more information entities matching one or more predefined information entity types in accordance with some implementations.

FIG. 12 is a flow diagram of a process for identifying in a message content one or more information entities matching one or more predefined information entity types in accordance with some implementations. Initially, the information entity server receives a message and a list of predefined information entity types (1202). In some implementations, the list may include, but is not limited to entity types corresponding to physical addresses, email addresses, common search phrases, billing statements, birthdays, predefined tasks, uncommon words or phrases, acronyms, phone numbers, object identification numbers (e.g., package shipment tracking numbers, International Standard Book Numbers (ISBN's), etc.), product names, company names, stock ticker symbols, movie titles, book titles, calendar entries, names of individuals (e.g., celebrities), city names, URLs, predefined event information, airline flight information, or any subset thereof. The list of entity types may include additional entity types. In some implementations, the information entity type list accompanying the message depends on the attributes of the message, such as subject, sender information, recipient information, conversation topic, etc. In some other implementations, the list of information entity types is the same for all messages and is therefore known to the information entity server 1120 in advance of receiving the message. The following table lists examples of relevant information that may be provided, and/or potential action(s) that may be performed by clicking on link provided in connection with several types of information entities. Some implementations may implement only a subset of these examples.

TABLE 1

| Information Entity Type | Potential Action(s) and Relevant Information |
|---|---|
|  | Physical addresses |
| Updating contact book, links to maps and driving directions |  |
| Email addresses | Updating contact book |
| Billing statements | Link to an on-line bill payment service |
| Birthday | Updating contact book |
| Predefined tasks | Link to a how-to article |
| Uncommon words or phrases | Dictionary definitions |
| Acronym | A complete expression; dictionary definition |
| Phone number | Updating contact book; link to VoIP phone service, if available |
| Object identification number (e.g., package shipment tracking number, International Standard Book Number (e.g., ISBN), etc.) | Link to shipment status; link to on-line bookstore |
| Product name | Link to product review pages, product image(s) and/or price comparison |
| Company name | Link to company website; link to news items |
| Stock ticker symbols | Stock price; links to news items and brokerage firms |
| Movie title | Link to movie rankings; link to movie reviews; link to movie schedule at a nearby movie theater |
| Books title | Link to on-line auction stores; link to book reviews |
| Calendar entries | Updating personal calendar |
| Name of individual (e.g., a celebrity) | Link to news items; link to personal website |
| City name | One or more links to hotel rentals, weather forecast, airfare, and/or tourist sites |

TABLE 1-continued

| Information Entity Type | Potential Action(s) and Relevant Information |
| --- | --- |
| URL | Thumbnail of web page; link to a web page |
| Predefined event information | Updating personal calendar; link to a list of attendees; link to information about the event |
| Airline flight information | Link to information about flight |

The server analyzes the message content based on the information entity type list (1204). By default, the information entity server is responsible for analyzing the message content against every information entity type unless the email server instructs otherwise. For example, the email server may determine for a particular message whether the information entity server 1120 should analyze the message to look for information entities matching a particular information entity type. The analysis by the information entity server includes identifying occurrences of each listed information entity type in the message content. An information entity module is invoked if one or more information entity types associated with the module appears in the information entity type list. Typically, information entity types that are closely related will be associated with the same information entity module. For example, physical address, email address and phone number are associated with a module responsible for any information entity type related to contact information.

In some implementations, every invoked information entity module updates a data structure associated with the message and shared by all the modules. The data structure includes a list of annotations of the message being analyzed. In some implementations, the data structure has an interface that enables quick iteration by the information entity modules and quick lookup of annotations in the list of annotations. Annotations associated with a particular information entity type within a particular range of bytes of the message can be easily identified in the data structure. There are at least two advantages of sharing the data structure among different modules. First, this allows the processing result of one module to be reused by a subsequent module, rather than having the subsequent module repeat the process. For example, if a message has been tokenized by one module, by adding an annotation to the data structure for each token identified in the message, a subsequent module can iterate over the tokenized annotations without re-tokenizing the message. Second, the shared data structure stores all information entities that have been found in the message so that each module can operate in a stateless mode, which simplifies the implementation of the information entity modules.

For each information entity identified in the message, a corresponding information entity module extracts it from the data structure (1206). Next, the information entity module submits an optional information request associated with the entity to a backend information source(s) (e.g., a map server) and retrieves related information provided by the backend information source(s) (1208). In some implementations, the information entity module submits a search query to the backend information source(s) and the query includes at least one term corresponding to the information entity. From the query results, the information entity module selects the most relevant items and associates it with the information entity (1210). After all information entity modules have received responses to their respective requests, the information entity server generates an ultimate response containing all extracted information entities and their associated information (or a selected subset of the extracted information entities and their associated information) to the email server (1214). In some implementations, the response includes display instructions for formatting and displaying one or more of the extracted information entities and their associated information at a client device.

In some other implementations, an information entity module generates one or more links associated with the information entity. A link may contain a search query to a specific information source. For example, if the identified information entity is a product name, the link could be a search query prepared for a product search engine like the Froogle search engine. In this case, the information entity module does not submit information requests to backend information sources. Rather, links are provided to an end user and he or she only needs to click on a link to get the relevant information. In yet some other implementations, the information entity module generates requests as well as links for an information entity and serves both types of responses to the end user. For example, if the identified entity is an address, it may be desired to serve to the end user both a thumbnailstyle map and a link to driving directions in connection with the requested email message.

FIGS. 13A-13C, 14A-14D, 15A-15B and 16 contain screenshots illustrating the types of information entities that may be identified in an email message and the information and/or links that are served to an end user requesting the email message in accordance with some implementations of the presentation.

Figure 13A:
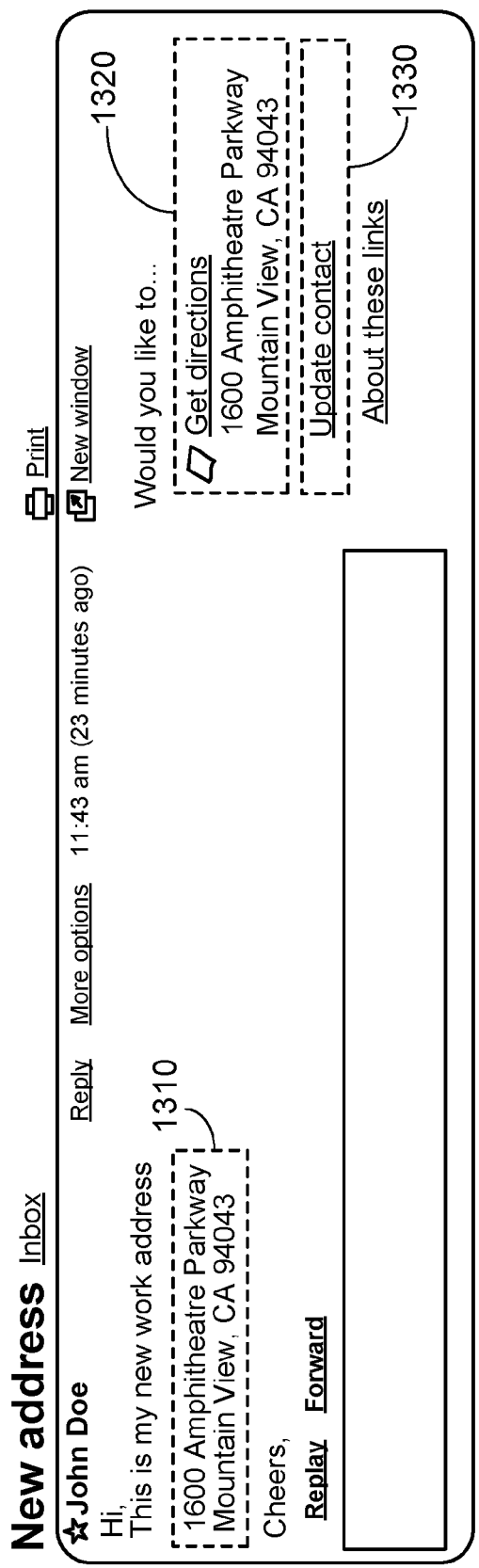
Figure 13B:
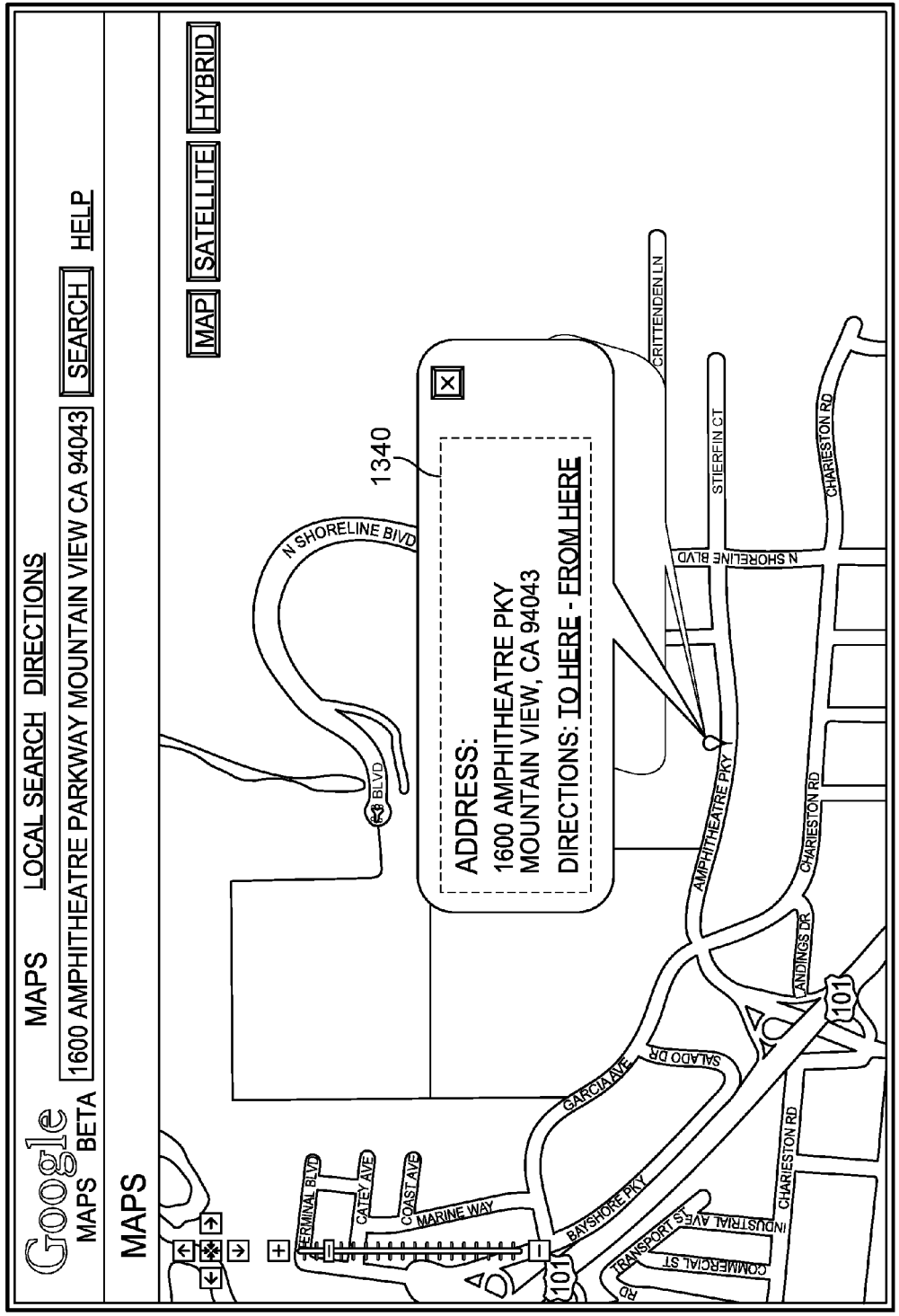

FIG. 13A is an exemplary screenshot of an email message including an address as well as links associated with the address and information corresponding to the address. The message body includes a physical address 1310. This address is identified by the information entity server and extracted from the message body. The extracted address is reproduced to the right of the message body and displayed as a link 1320 to driving directions. A user clicking on this link will be directed to a map of the physical address as shown in FIG. 13B. Below this driving direction link 1320 is another link 1330 to update the contact information of the sender. When the user clicks on link 1330, a separate window (FIG. 13C) pops up with pre-populated fields 1350 derived from the message shown in FIG. 13A.

Figure 14C:
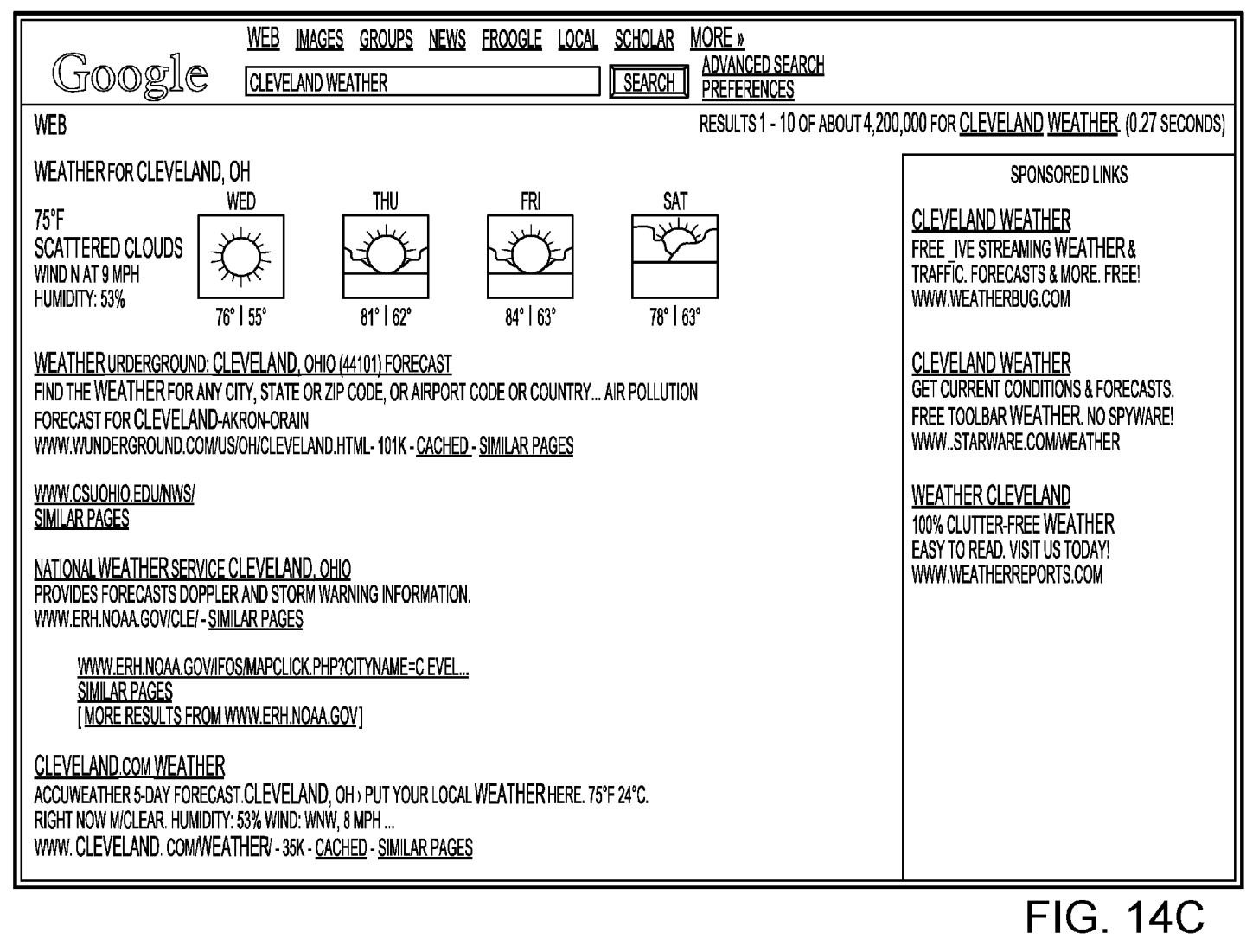
Figure 14D:
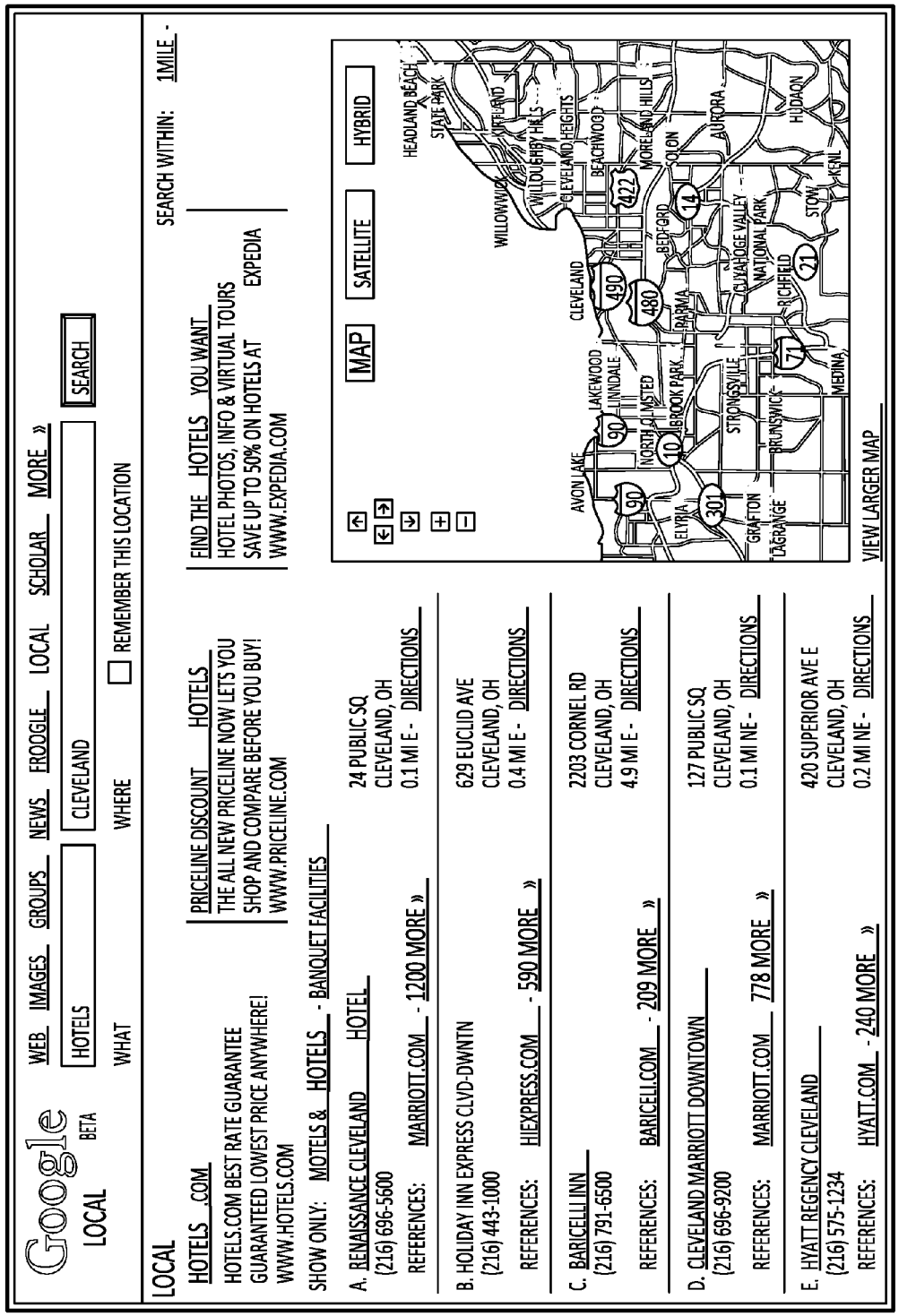

FIG. 14A is an exemplary screenshot of an itinerary message including information entity such as city name 1440 "Cleveland, Ohio" To the right of the message body are three hyperlinks 1410, 1420, and 1430. These links are generated by the information entity server after identifying the city name in the message body. Link 1410 directs the user to a separate window (FIG. 14B) if he or she wants to add the flight information to his or her personal calendar. Adding the flight information to a calendar can enable the user to receive a reminder of the trip, or to share this information with other people who have access rights to the user's calendar. The calendar entry may include fields 1450, 1452, 1454, 1456, 1458, at least some of which are filled with information extracted from the itinerary message (FIG. 14A), such as a title (1452), a location (1454), begin and end dates and/or times (1456), and a calendar entry description. Link 1420 directs to the user to a web page (FIG. 14C) including weather information for Cleveland, Ohio. Link 1430 directs the user to a web page (FIG. 14D) that includes hotel information for Cleveland, Ohio. As shown in FIGS. 14C and 14D, the two links 1420 and 1430 essentially correspond to two search queries for different types of content. The queries may be directed to the same or different search engines or websites.

Figure 15B:
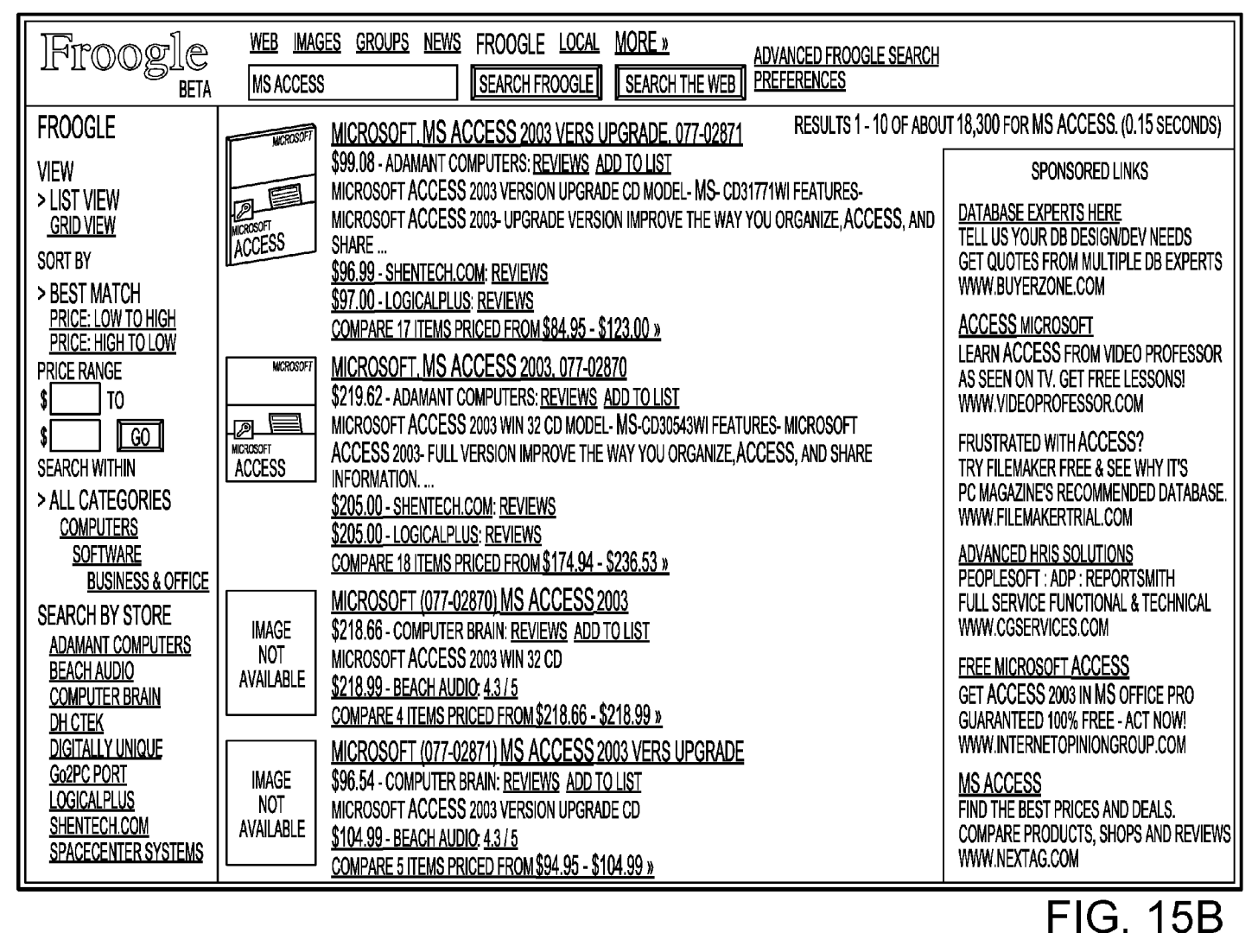
Figure 16:
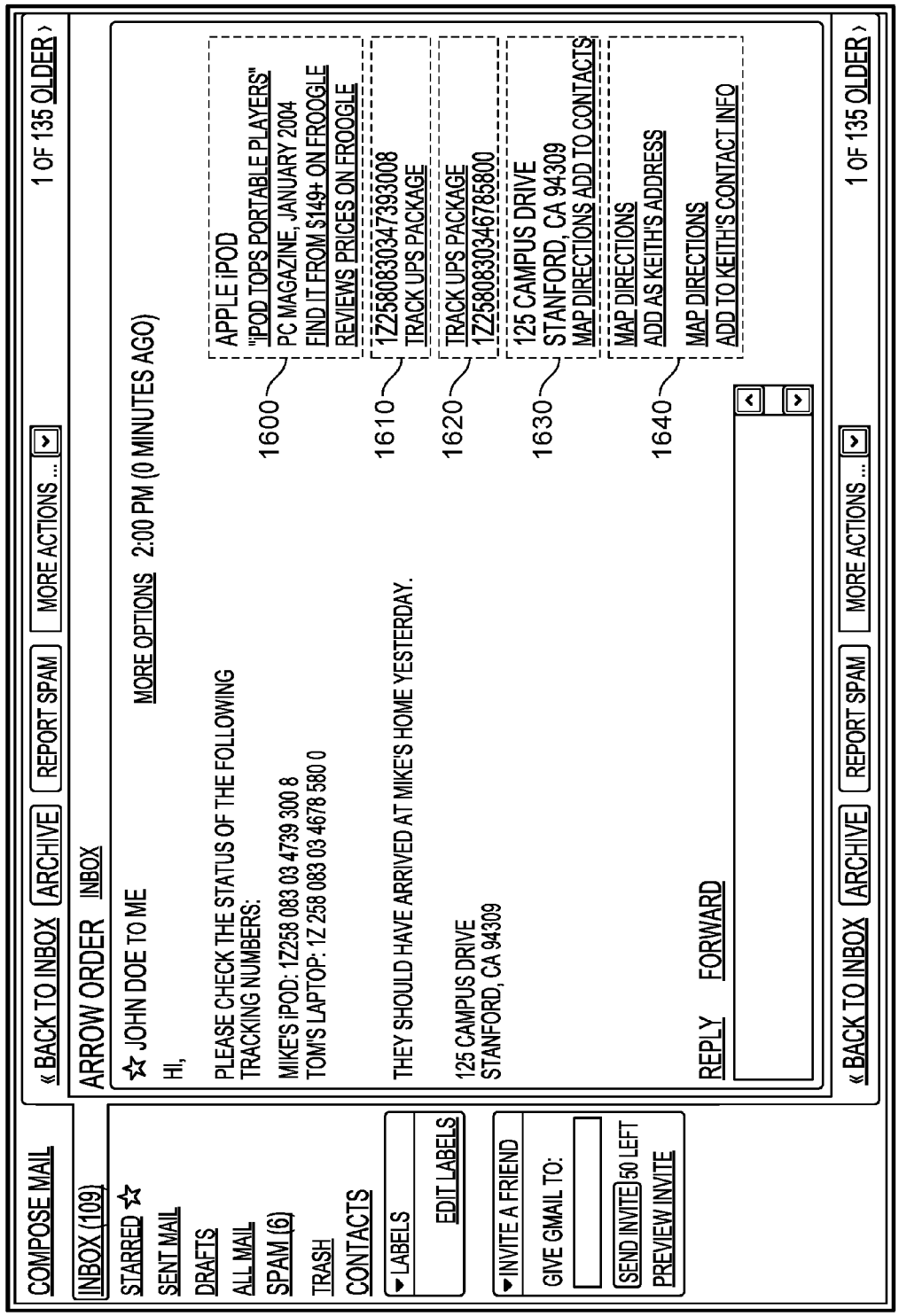
FIG. 16 is an exemplary screenshot of an email message including information entities like a product name, two package shipment tracking numbers and an address as well as links associated with the information entities in accordance with some implementations.

FIG. 15A is an exemplary screenshot of an email message including a software product name "MS Access". A link 1510 to a product search engine is displayed to the right of the message body. When a user clicks on the link, he or she will be directed to a separate window (FIG. 15B) listing relevant information about the product, such as prices, images, vendors. FIG. 16 is another exemplary screenshot of an email message including a number of information entities, including a product name, "iPod," two package shipment tracking numbers and an address. To the right of the message body, the displayed window includes advertisements 1600 related to the product name "iPod", links 1610, 1620 to the shipping status of the two packages and links 1630, 1640 to maps and driving directions associated with the address in the message body.

Figure 17:
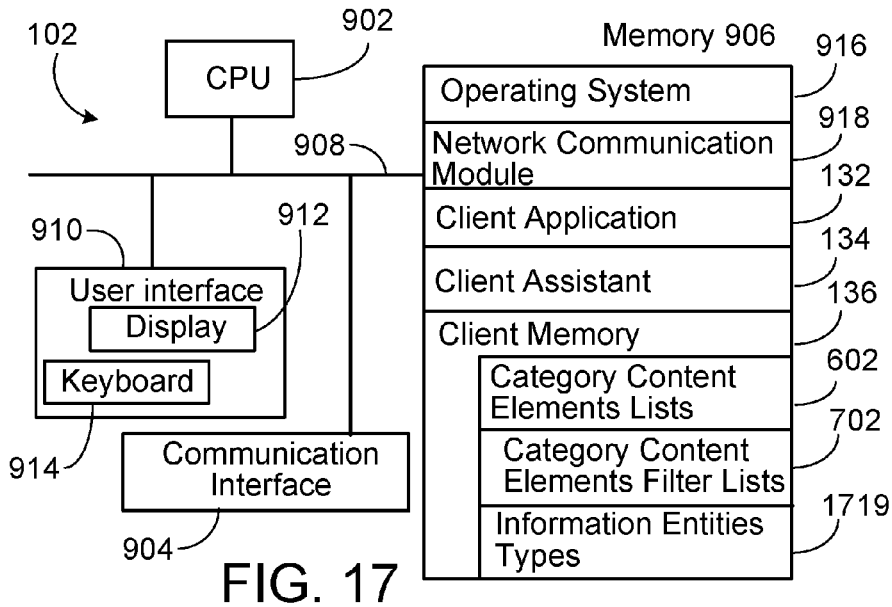
FIG. 17 is a block diagram of an exemplary client in accordance with some implementations.

FIG. 17 is a block diagram of an exemplary client 1102 in accordance with some implementations. As mentioned above, the structure of client 1102 is very similar to that of client 102, shown in FIG. 9. Besides the components or elements discussed above in connection with FIG. 9, client memory 1136 may include information about the predefined information entity types 1719 associated with an email message.

Figure 18:
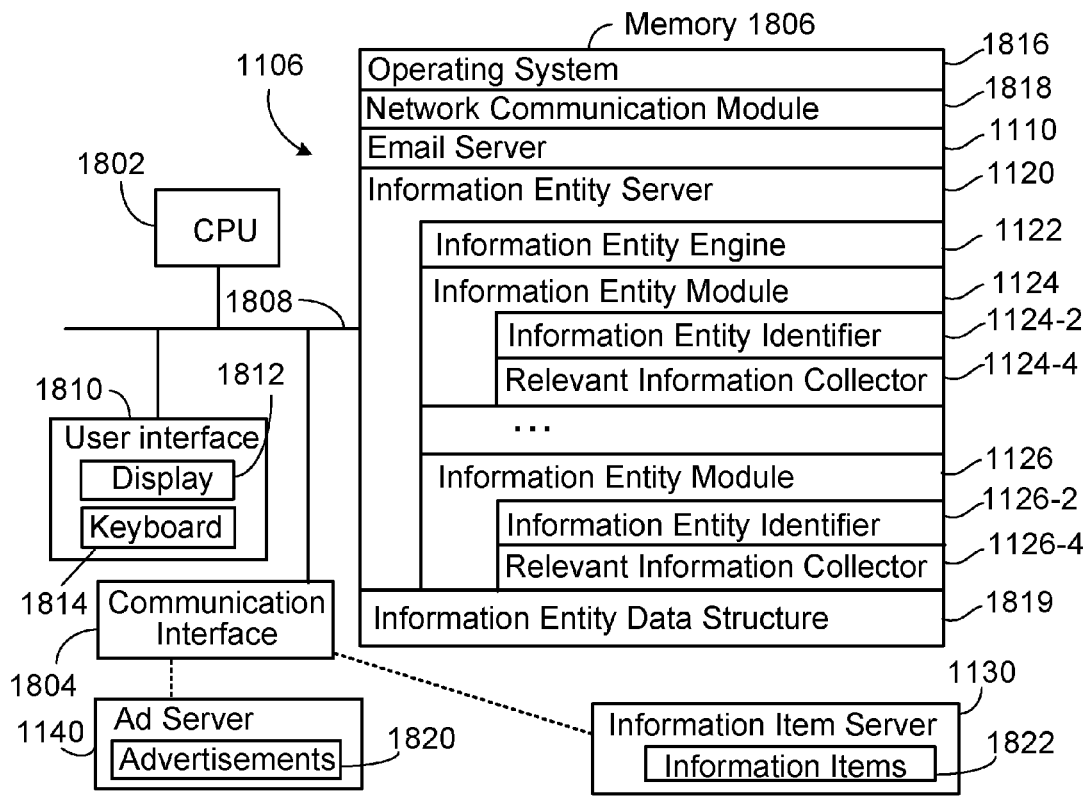
FIG. 18 is a block diagram of an exemplary information entity server in accordance with some implementations.

FIG. 18 is a block diagram of an exemplary information entity server 1106 in accordance with some implementations. The information entity server 1106 typically includes one or more processing units (CPUs) 1802, one or more network or other communications interfaces 1804, memory 1806, and one or more communication buses 1808 for interconnecting these components. The information entity server 1106 optionally may include a user interface 1810 comprising a display device 1812 and a keyboard 1814. Memory 1806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1806 may optionally include one or more storage devices remotely located from the CPU(s) 1802. In some implementations, memory 1806 stores the following programs, modules and data structures, or a subset thereof:
- an operating system 1816 that includes procedures for handling various basic system services and for performing hardware dependent tasks;
- a network communication module 1818 that is used for connecting the information entity server 1106 to other computers via the one or more communication network interfaces 1804 and one or more communication networks, such as the Internet, other wide area networks, local area networks, metropolitan area networks, and so on;
- an email server 1110 for receiving requests from and serving requested messages to a requesting client 1102;
- an information entity server 1120 for receiving messages and information entity types from the email server 1110 and serving related information or links to the email server 1110; and
- information entity data structure 1819 that includes a list of information entities identified in a message and their related information.

In some implementations, the information entity server 1106 includes the following elements, or a subset or superset of such elements: an information entity engine 1122 for responding to a variety of requests from the email server 1110 returning targeted information based on identified information entities and one or more information entity modules (1124, 1126) for identifying information entities in a message and collecting information related to the information entities.

The information entity server 1106 can be connected to ad server 1140 and/or information item server 1130 via the communication interface 1804. Ad server 1140 can contain one or more advertisements 1820. The ad server 1140 can receive input and return advertisements that can be relevant to the input. The information item server 1130 can include one or more information items 1822. Similar to the ad server 1140, the information server 1130 can receive input and return informational items that can be relevant to the input.

Each of the above identified elements in FIGS. 17 and 18 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, memory 1706 or 1806 may store a subset of the modules and data structures identified above. Furthermore, memory 1706 or 1806 may store additional modules and data structures not described above.

Although FIGS. 17 and 18 show, respectively a client 1102 and an information entity server 1106, the figures are intended more as functional descriptions of the various features which may be present in a client and set of servers than as a structural schematic of the implementations described herein. In practice, and as recognized by those of ordinary skill in the art, items shown separately could be combined and some items could be separated. For example, some items shown separately in FIG. 18 could be implemented on single servers and single items could be implemented by one or more servers. The actual number of servers used to implement an information entity server 1106 and how features are allocated among them will vary from one implementation to another, and may depend in part on the amount of data traffic that the system may handle during peak usage periods as well as during average usage periods.

Targeting Information Based on Reply Message Content

Figure 19:
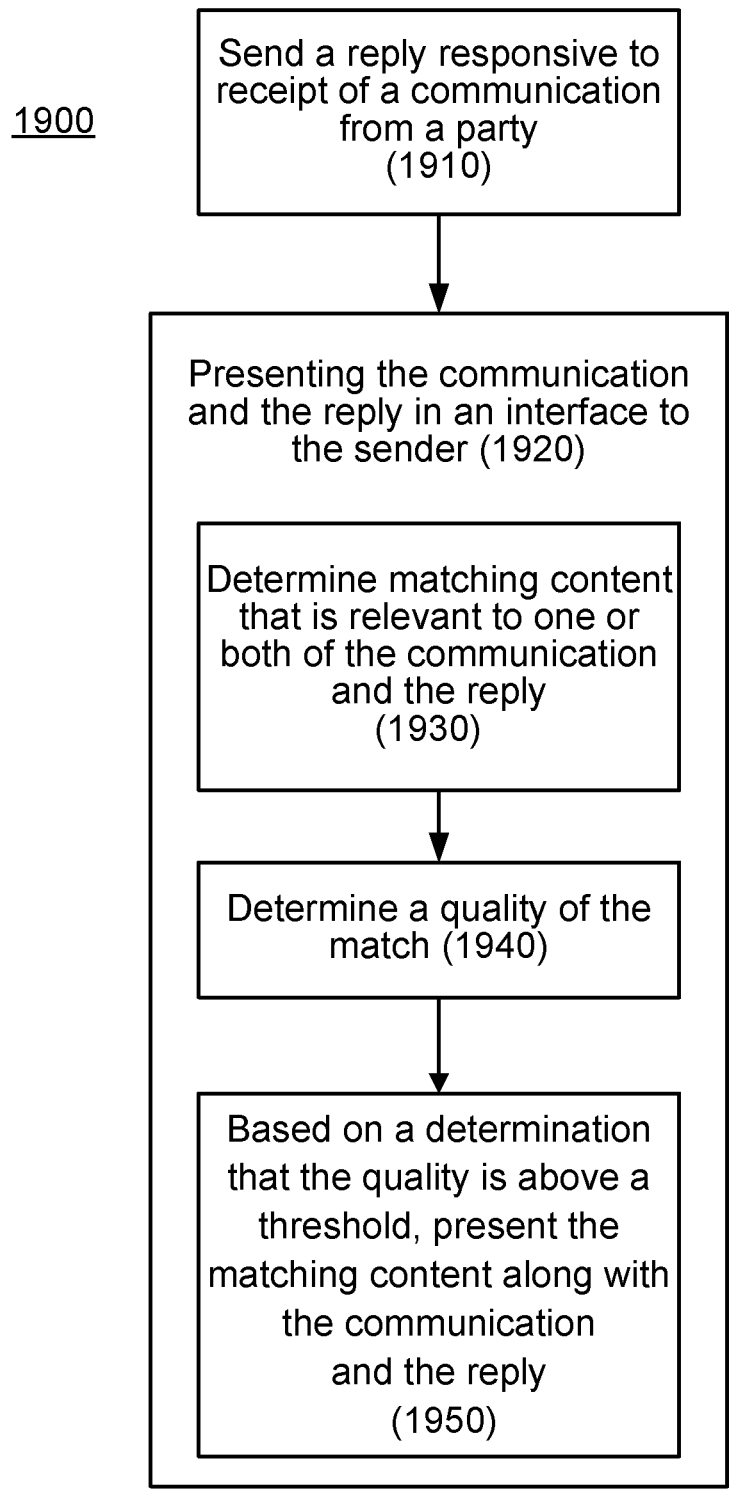
FIG. 19 is a flow chart of a process by which matching content is presented along with the communication and the reply.

FIG. 19 is a flow chart of a process 1900 by which matching content is presented along with a communication and a reply. The communication and the reply form part of a conversation and can be presented in a conversation view as described above. Generally, the operations shown in FIGS. 19-23 may be performed using the systems described previously. For example, the operations may be performed using an e-mail server 1110 that interfaces information entity server 1120, the information item servers 1130, and the ad server 1140. In presenting information to a party through a messaging application, a reply is sent responsive to receipt of a communication from a party (1910). For example, the party receiving an electronic mail message may select a "reply" button in the messaging application, draft a reply message, and click a "send" button in order to send the reply message. The client application transmits the reply message across the communications network for transmission to a recipient using the e-mail server 1110.

The reply is presented in an interface to the sender of the reply (1920). In some implementations, the reply is presented along with the communication to which it corresponds. In some implementations, other portions of the conversation to which the reply and the communication belong are displayed. The communication may include a description indicating that the present display in a web-based messaging interface relates to a conversation between the sender and the recipient. Presenting the reply includes determining matching content that is relevant to one or both of the communication and the reply (1930). For example, the web-based messaging system may interface with an information entity engine to analyze the content of the reply message that was just sent. Terms and phrases appearing in the message may be analyzed for keywords and contextual meaning to identify a predicted interest of the user. In some embodiments, these terms and phrases may be filtered for sensitive topics or personally identifiable information that is excluded from the targeting process.

In some embodiments information related to the individual user, including personally identifiable information and/or sensitive content, may be filtered out such that this information is partially or completely excluded from the targeting process. In some embodiments, the predicted interest of the user (e.g., a score indicating the quality of the match) may be adjusted to reflect other factors including stored profile information for the sender and the recipient. The predicted interest then may be used to analyze a library of candidate content to identify matching content that is determined to be responsive to the user's interest. This predicted interest of the user may employ privacy protections to restrict or reduce the use of personally identifiable information in targeting the advertisement.

A quality of the match is determined (1940). In one configuration, determining the quality of the match includes developing a series of one or more scores for each of several instances of candidate content. Determining the quality of the match may give additional or enhanced weighting to the content appearing in the reply message. The enhanced weighting of the reply message is enhanced relative to other content that appeared in earlier portions of the conversation and/or relative to known profile information for parties, i.e., the sender and/or recipient.

Based on a determination that the quality is above a threshold, the matching content is presented along with the reply (1950). For example, the score for one or more instances of candidate content may be compared to a threshold value. The threshold value may be set so that only matching content deemed particular relevant is presented, or so that matching content is only presented between the conversation view and the reply.

In one configuration, the matching content may include an advertisement. The matching content also may include breaking or relevant news, contact information, calendar appointments that link to other services offered by an online service provider, or other content found in the user's digital library.

In some embodiments, the matching content may be displayed in the form of a snippet shown between the communication and the related reply. The matching content snippet may be distinguished from the messages by a variation in color, border, shape, font, appearance, or other formatting. For example, the matching content snippet may interactively fade in as a small free-floating snippet between the communication and reply while the reply is being drafted, immediately after the reply is sent, or shortly after the reply is sent. For example, the matching content snippet may appear in a reverse color format to other messages, and may be expanded to provide more targeted content in a form similar to a message snippet when expanded, or it may direct the user to a targeted content overlay, iframe, or separate content landing page. The targeted content may include, for example, a widget that indicates that the user would like the targeted content to remain a part of the conversation after other actions are taken, or a widget that indicates the user would like the targeted content to be sent to other participants in the conversation.

Figure 20:
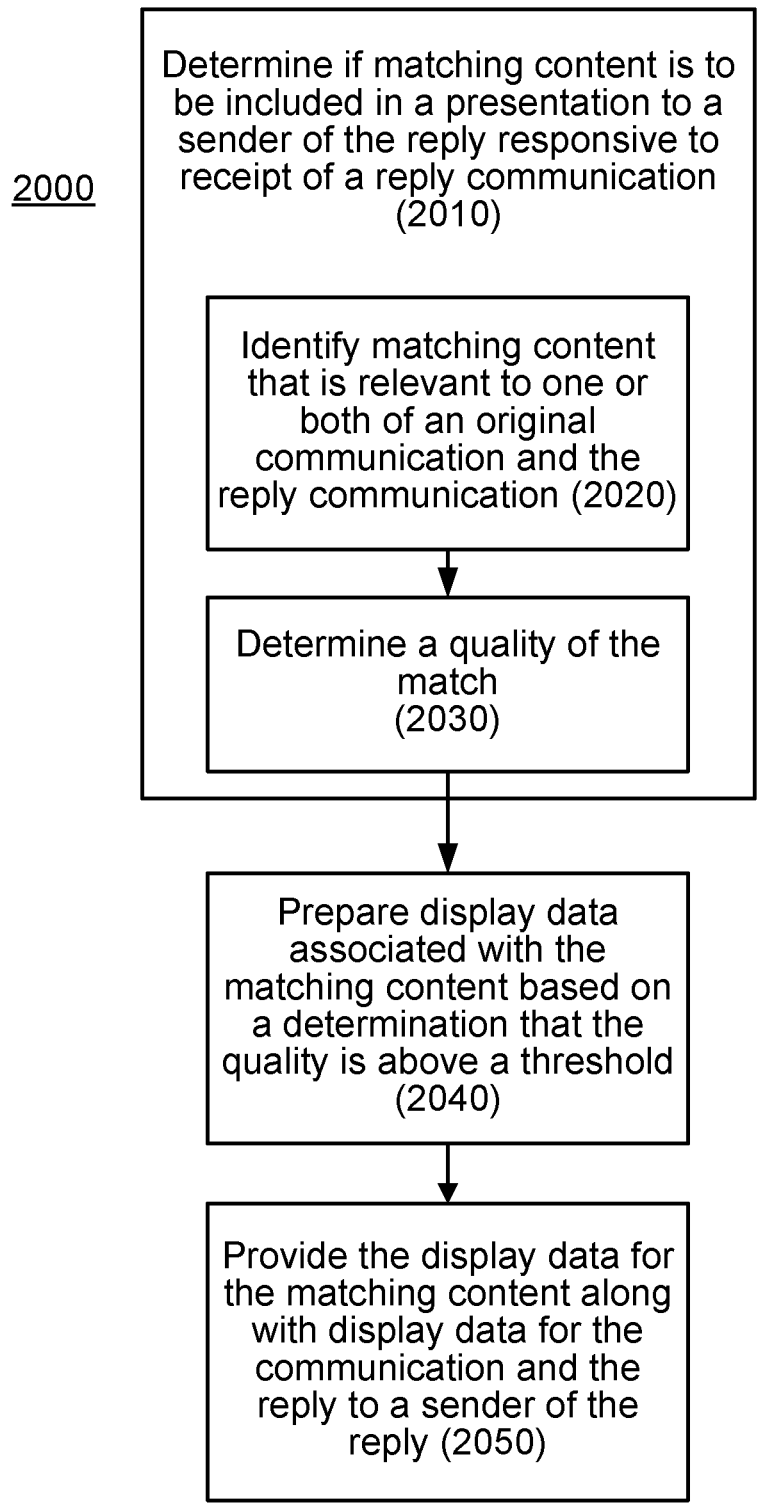
FIG. 20 is a flow chart of a process by which display data for matching content is provided along with display data for the communication and the reply to a sender of the reply.

FIG. 20 is a flow chart of a process 2000 by which display data for the matching content is provided along with display data for the communication and the reply to a sender of the reply. Generally, information is presented to a party through a messaging application.

Initially, it is determined if matching content is to be included in a presentation to a sender of the reply responsive to receipt of a reply communication (2010). For instance, an online service provider may only wish to including matching content between display data for a communication and a reply if matching content is determined to be of a pronounced significance. Limited display space between two different portions of the user interface may dictate that the likelihood of a user selecting (e.g., clicking on) the matching content is greatly reduced if the viewing user cannot readily discern the relevance of the matching content that is presented.

Determining if matching content is to be included in a presentation includes identifying matching content that is relevant to one or both of an original communication and the reply communication (2020). For example, the e-mail server 1110 may provide key words appearing in the information entity server 1120 in order to identify matching content.

A quality of the match is determined (2030). The information entity server may consider various sources of input and give different weighting to each source. For example, profile information for a user may be analyzed and given a first weight, while current events and trends from a larger user community may be given a second weight. An lengthy conversation of multiple replies between two parties may be considered so that older portions of the conversation are given less weight than more recent replies. Active viewing of the content of a reply message being sent may be given elevated importance to reflect the fact that the reply message was the focus of the user's attention as a result of the message being sent in the past few seconds and also to reflect the fact that the interface is configured to present matching content immediately to an active viewer (the party that is the sender). As a result of the importance of the timeliness and other factors reflecting active interaction and viewing, the proportion of the score based upon the reply message being sent may be critical factors in determining whether a required threshold is exceeded.

Based on a determination that the quality is above a threshold, display data associated with the matching content is prepared (2040). The display data may include a description of the participants in a conversation such as the identity of the parties and the orientation of the conversation during a particular display (e.g., sender or recipient). The display data for the matching content is provided along with display data for the communication and the reply to a sender of the reply (2050). For example, an advertisement may be presented between a conversation block and the sent message or between a label for the conversation and the sent message.

Figure 21:
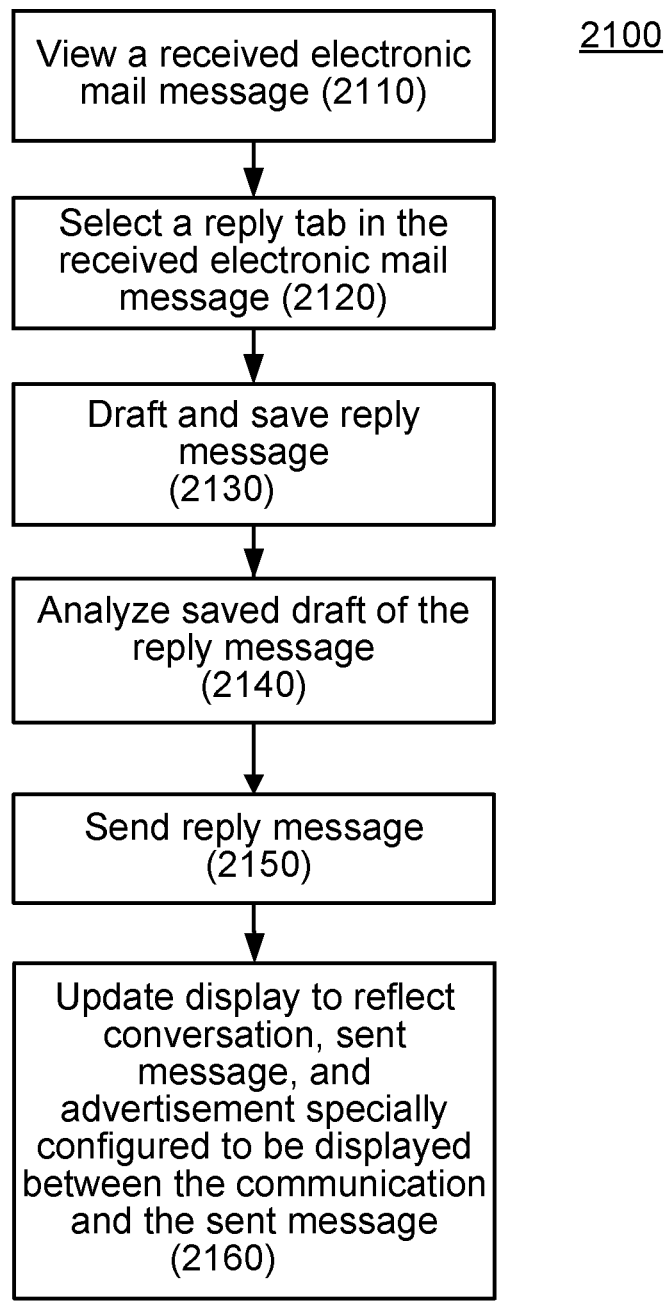
FIG. 21 is a flow chart of a process by which a conversation view including a received communication and a reply to the received communication is displayed.

FIG. 21 is a flow chart of a process 2100 by which a conversation view including a received communication and a reply to the received communication is displayed. Initially, a user views a received electronic mail message (2110). For example, the user may access an electronic mail message through a web browser. The user then selects a reply tab in the received electronic mail message (2120). The user may wish to reply to an ongoing and/or multiparty communication string to reflect the user's present view on a particular subject matter. A draft (i.e., the reply) is then generated and optionally the reply message is saved (2130). The web-based messaging application may feature dynamic scripts that save drafts to an inbox to prevent loss of drafted text in the event that the web-based messaging application 1102 experiences an interruption. The draft may be saved in a draft folder stored on an e-mail server 1110. The reply message is analyzed (2140). To increase the timeliness in which matching content is identified, matching content may be identified as the message is being drafted. A pool of potential results that may be displayed as matching content may be generated and updated in real time as a draft electronic mail message is revised. Little or additional processing may be required depending on the degree of analysis that is performed prior to sending the reply message. The user sends the reply message (2150), for example, by selecting a send button.

The display is updated to reflect the conversation, the sent message (i.e., the reply), and the matched content (e.g., the advertisement) (2160. In some implementations, the matched content is positioned to be displayed between the communication and the sent message on the display of the sender of the reply. Other locations are possible, such as on the display of the message recipient before the reply in the conversation. In some implementations, after the user selects the send button, the display is immediately updated to reflect the transition of a draft reply message into a sent message. Because the draft reply message may be configured to occupy the portion of the display where the reply message was being drafted, the user may be focused on the same region immediately following selection of a "send" button. Presenting matching content proximate to the same region representing the user's area of focus may reduce the user's burden without requiring the change their focus in order to consider more distant portions of a display from their focal area.

Figure 22:
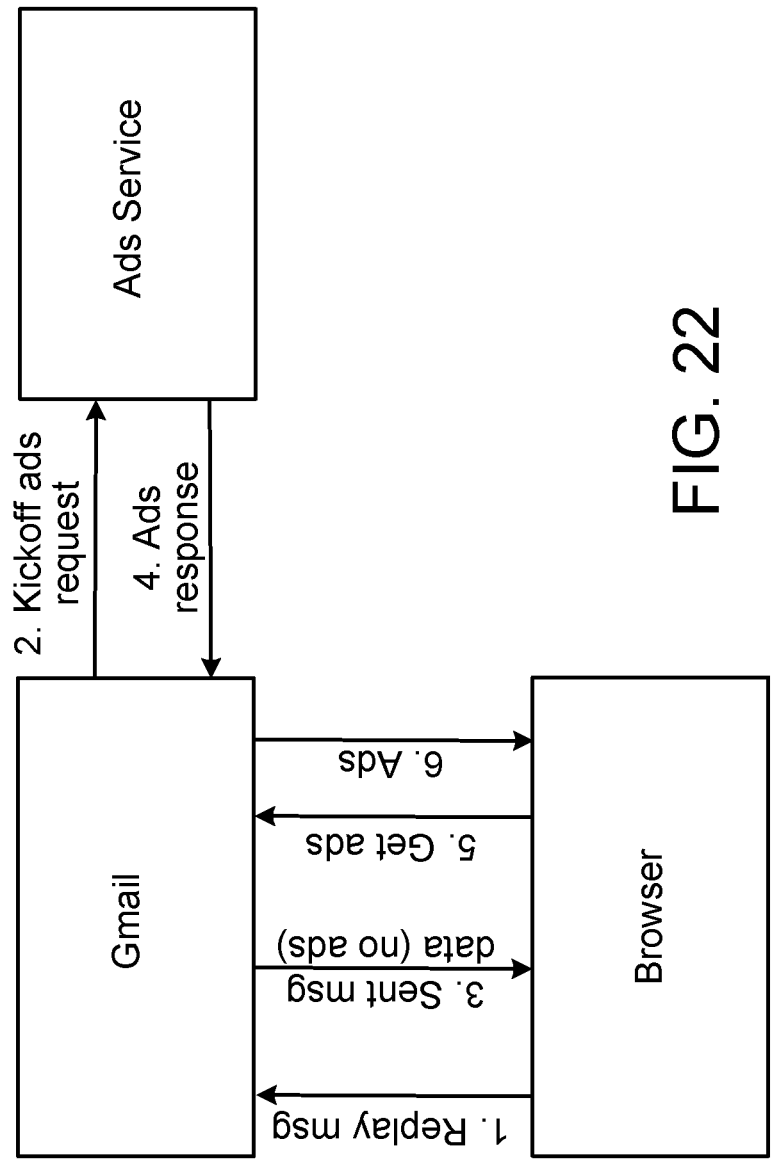
FIG. 22 is a flow chart of a process by which an advertising service provides advertisements in response to a request from a messaging system.

FIG. 22 is a flow chart of a process 2200 by which an advertising service provides advertisements in response to a request from a messaging system. Initially, a reply message is sent from a browser to a messaging system (e.g., the Gmail system). The Gmail system updates the display on the browser by displaying the sent message. The Gmail system also "kicks off" an ad request to the Ads service. The Ads service provides an ads response to the Gmail system, that is, matching content such as an advertisement. The browser requests the advertisement, which the Gmail system, in turn, provides.

Figure 23:
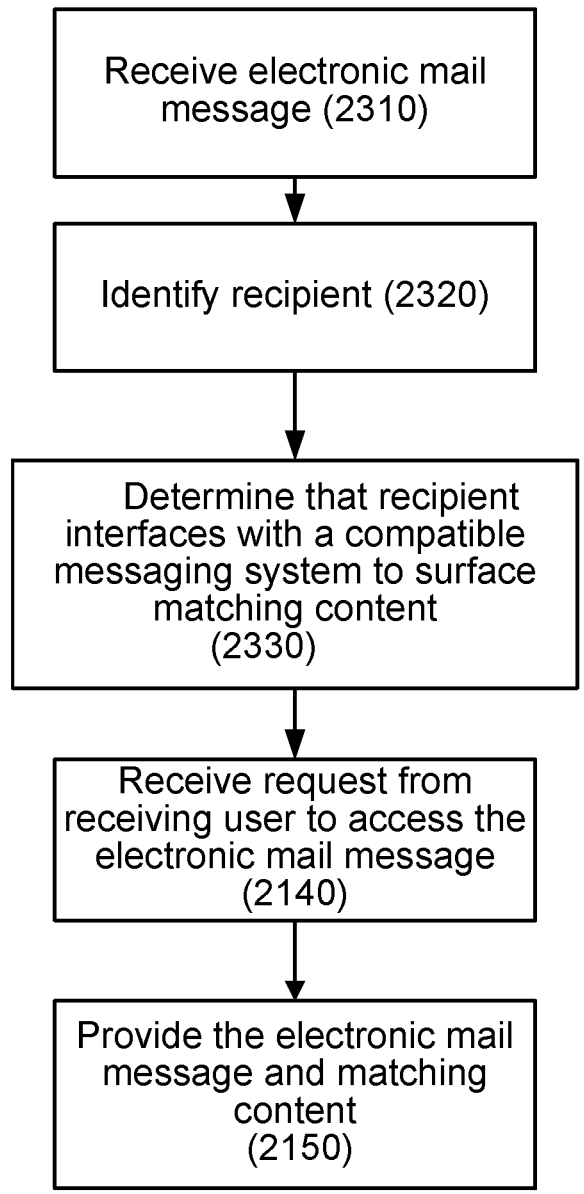
FIG. 23 is a flow chart of a process by which a receiving user is presented with a conversation view with matching content.

FIG. 23 is a flow chart of a process 2300 by which a receiving user is presented with matching content in a conversation view. Although many of the previous examples described how a client application provided matching content to a sending user, the systems also may be configured to provide matching content to a receiving user.

Initially, an e-mail server receives an electronic mail message (2310). The e-mail server identifies the recipient (2320). The recipient may be identified by the email address, a profile label, a screen name, or other identifier. The e-mail server determines that recipient interfaces with a compatible messaging system to present matching content (2330). In one configuration, the e-mail server determines that the recipient uses the same online service provider as the sender. For example, the e-mail server may determine that both the sender and the recipient use Gmail. Alternatively, the online service provider may use a communications protocol so that different online service providers may interface with one another to provide matching content. The different online service providers may agree to previously-designated structures to incentivize participation with systems configured to provide matching content (e.g., royalties, reimbursements, and commissions). The e-mail system may identify matching content based on the content of the message and provide the matching content to the sending user as a client application on the sending client displays the sent message.

The e-mail system receives a request from the receiving user to access the electronic mail message (2340). In one configuration, the e-mail system determines that the matching content identified for the sending user should also be displayed to the recipient user (not shown). Alternatively, the e-mail system may identify different matching content for the recipient user. The different matching content may reflect differences in profiles between sending and receiving users. The different profiles may cause the sent message to be analyzed in a different context. The e-mail system provides the electronic mail message and the matching content (2350).

Figure 24:
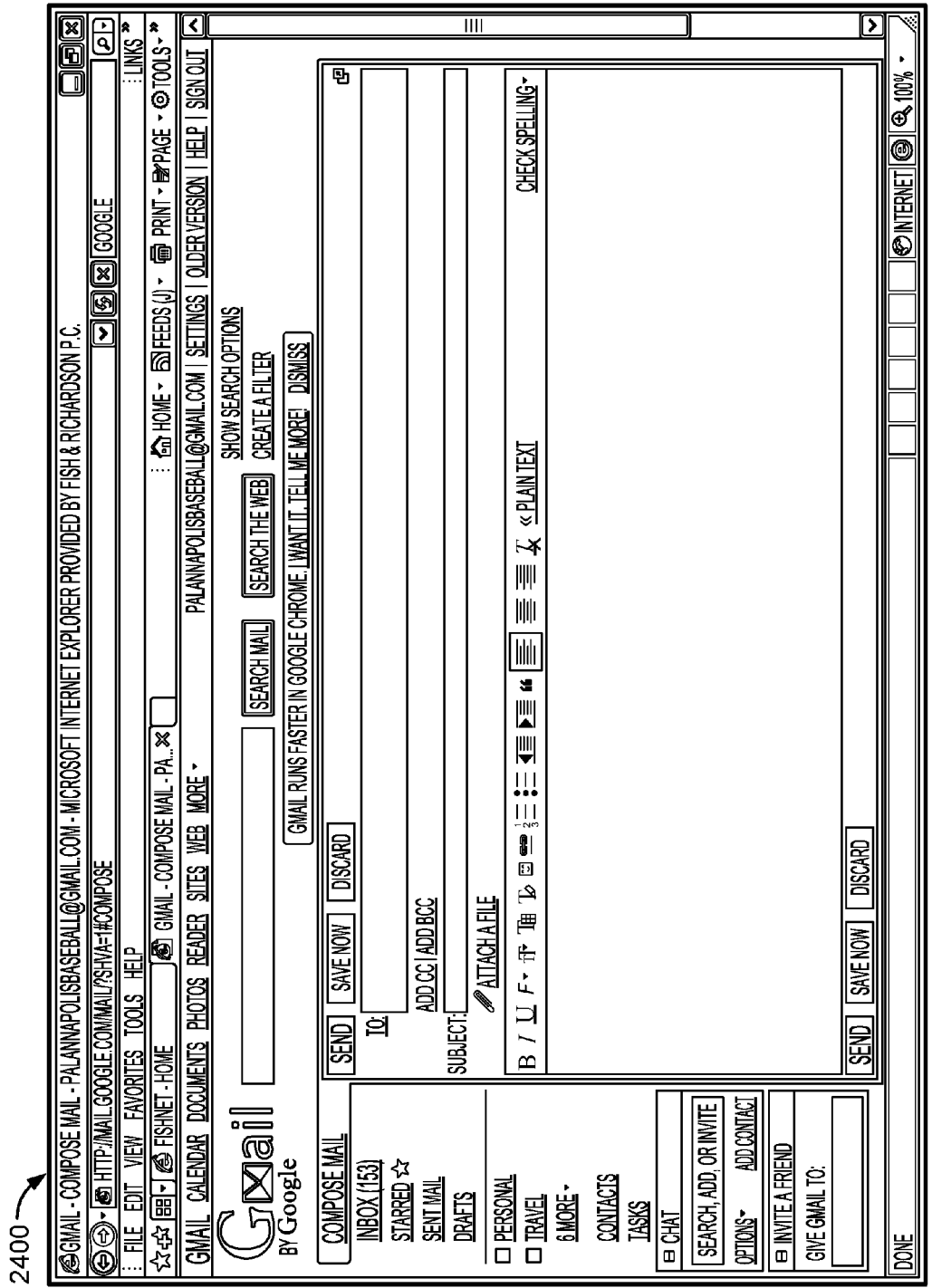
FIG. 24 is a screen shot of a web interface in a messaging system that enables a message to be created.

FIG. 24 is a screen shot 2400 of a web interface in a messaging system that enables a message to be created. Screen shot 2400 represents a web interface with which a sending user may interact in order to draft and generate a message. Screen shot 2400 includes an interface to specify recipients, specify a subject line, and draft and format the content of a message.

Figure 25:
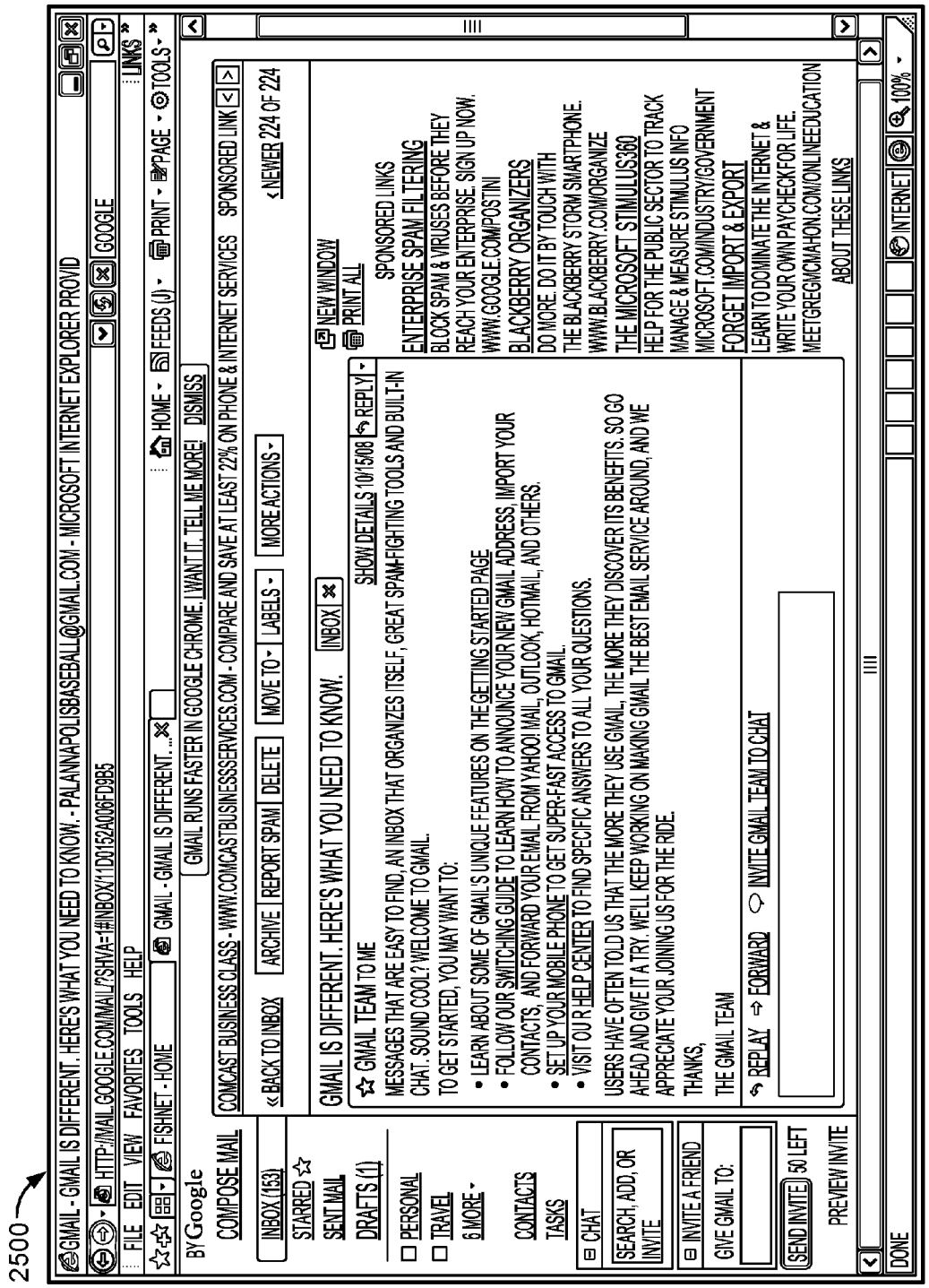
FIG. 25 is a screen shot of a web interface in a messaging system that enables a received message to be viewed.

FIG. 25 is a screen shot 2500 of a web interface in a messaging system that enables a received message to be viewed. Although screen shot 2500 only shows a single message, multiple messages within a conversation may be displayed. In one configuration, the most recent message is displayed closest to the portion of the display actively being viewed (e.g. "higher up"). Alternatively, the conversation may be threaded to permit the user to navigate through a complex exchange of messages. Screen shot 2500 includes several active controls, such as "reply" and "forward". These controls may be used to dynamically reconfigure the web interface to introduce new functionality (e.g., the ability to forward a message) without changing the context or peripheral portions of the active display. Thus, a user need not experience an interruption in the experience through the web-based messaging interface. A user may engage in a series of ongoing operations, each of which only triggers a revision to a small portion of the display. One such revision may include providing matching content to the adjoining portions of the active display and/or embed matching content within the portion of the active display in which the user is actively modifying content.

Figure 26:
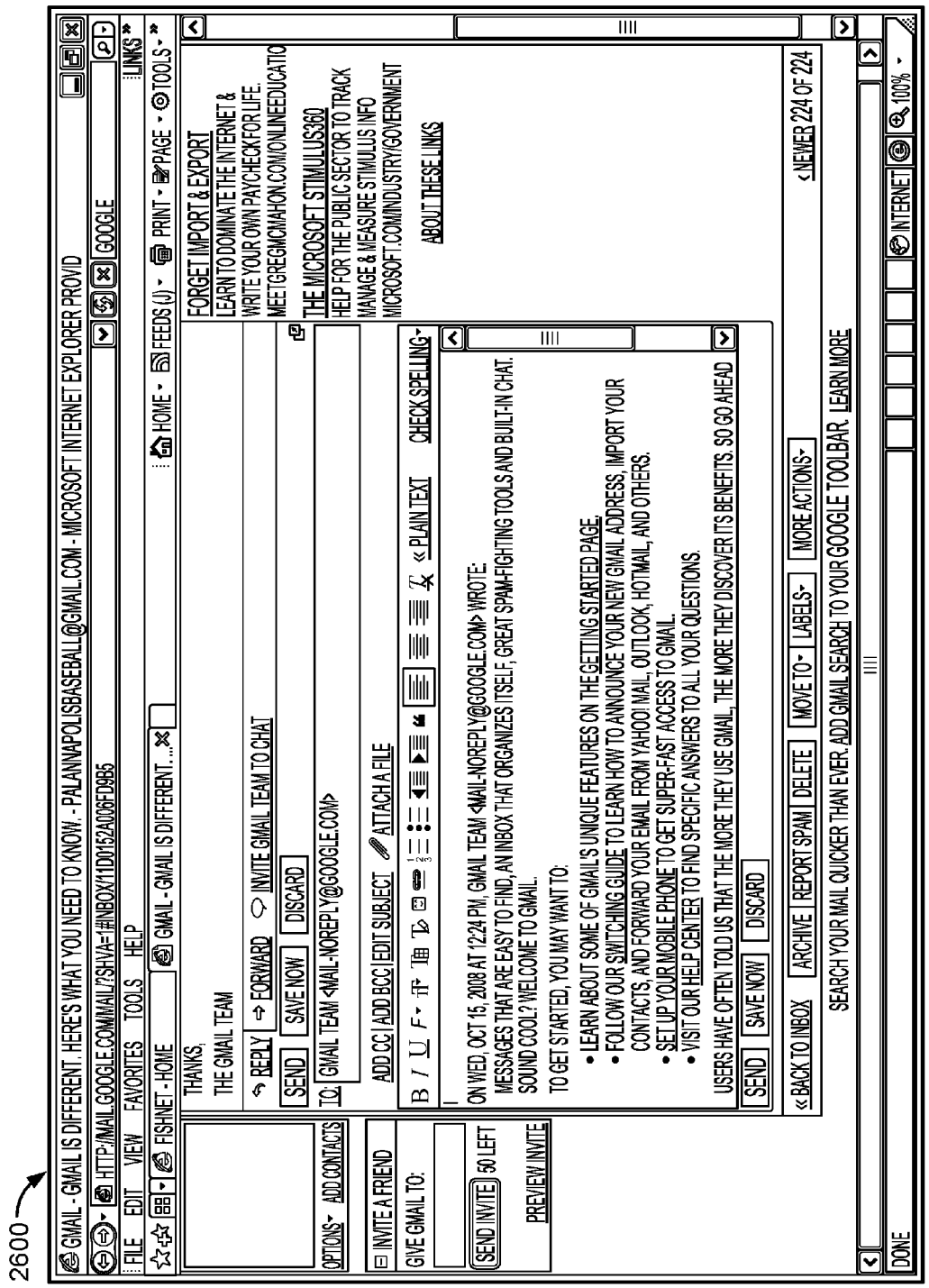
FIG. 26 is a screen shot of a web interface in a messaging system that enables a reply message to be created.
Figure 27:
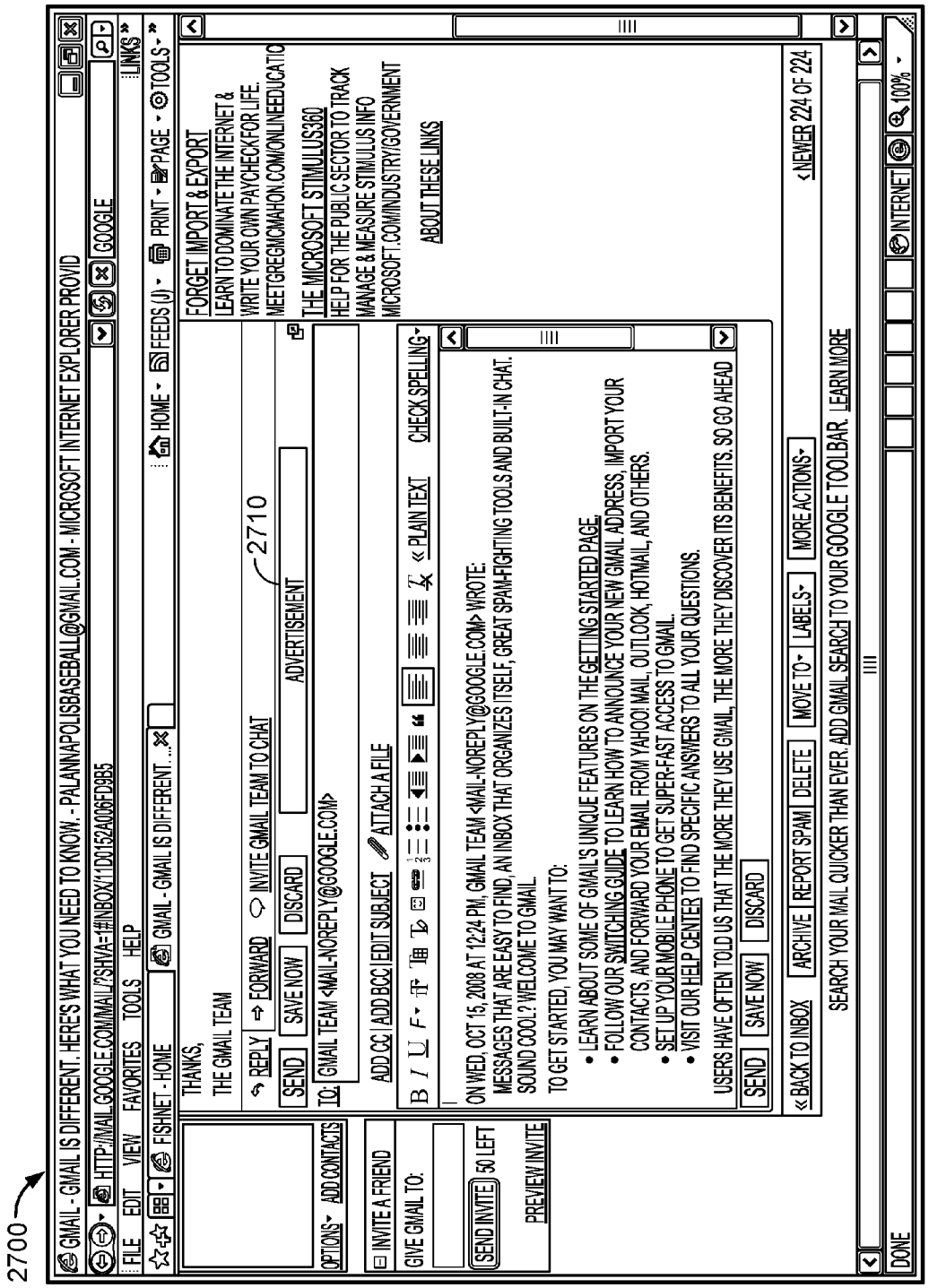
FIG. 27 is a screen shot of a reply message in which matching content has been embedded between the received message and the reply message.

FIG. 26 is a screen shot 2600 of a web interface in a messaging system that enables a reply message to be created. Screen shot 2600 may be generated as a result of the user selecting a "reply" button. User interaction with the reply button may cause the active portion of the display to be reconfigured so that a conversation appears in the top portion of the display, message header information appears within shaded display in the middle of the active portion of the display, and editable text of the previous message appears below the message header information. FIG. 27 is a screen shot 2700 of a reply message in which matching content has been embedded between the received message and the reply message. In particular, screen shot 2700 illustrates that advertisement 2710, which represents matching content, may be provided in a web interface to a messaging system. In one configuration, screen shot 2600 represents a presentation of the web interface when matching content is not presented (e.g., not available such as when a score for the matching content is below the required threshold). Screen shot 2700 represents a configuration where matching content is available and presented. In some implementations, matching content may be limited so that matching content is only displayed a threshold number of times (i.e., throttled based on throttling rules), or in a specified ratio so that only a limited number of viewing opportunities feature matching content. In some embodiments, the matching content may be presented during the draft of the reply. In some embodiments, the matching content may be presented upon receipt of a further communication in a conversation, between the previous message in the conversation and the newly received message in the conversation.

Each communication may be an email message, or it may be a message relaying pictures, movies, music, a widget, an application, a game, or the like from one user to another in a conversation format. In each such communication message type, the matching content can appear between the most recent communication and a newly sent reply on the screen of the replying user, or, in some embodiments, between a recent communication and a newly recently received communication on the screen of the receiving user.

FIG. 28 is a screen shot 2800 of a sent message that displays matching content embedded between the sent message and the communication. Specifically, screen shot 2800 illustrates how matching content may be dynamically added to a display as a result of the user selecting to send a reply message. Screen shot 2800 may be generated as a result of 1) receiving a message, 2) drafting a reply message, 3) analyzing the reply message, 4) identifying matching content, 5) determining a quality score for the matching content, 6) comparing the quality score to a threshold, 7) determining that the quality score exceeds the threshold, 8) receiving an instruction to send the reply message, and 9) providing a display that includes the conversation, the sent message, and the matching content displayed between the conversation and the sent message.

Figure 29:
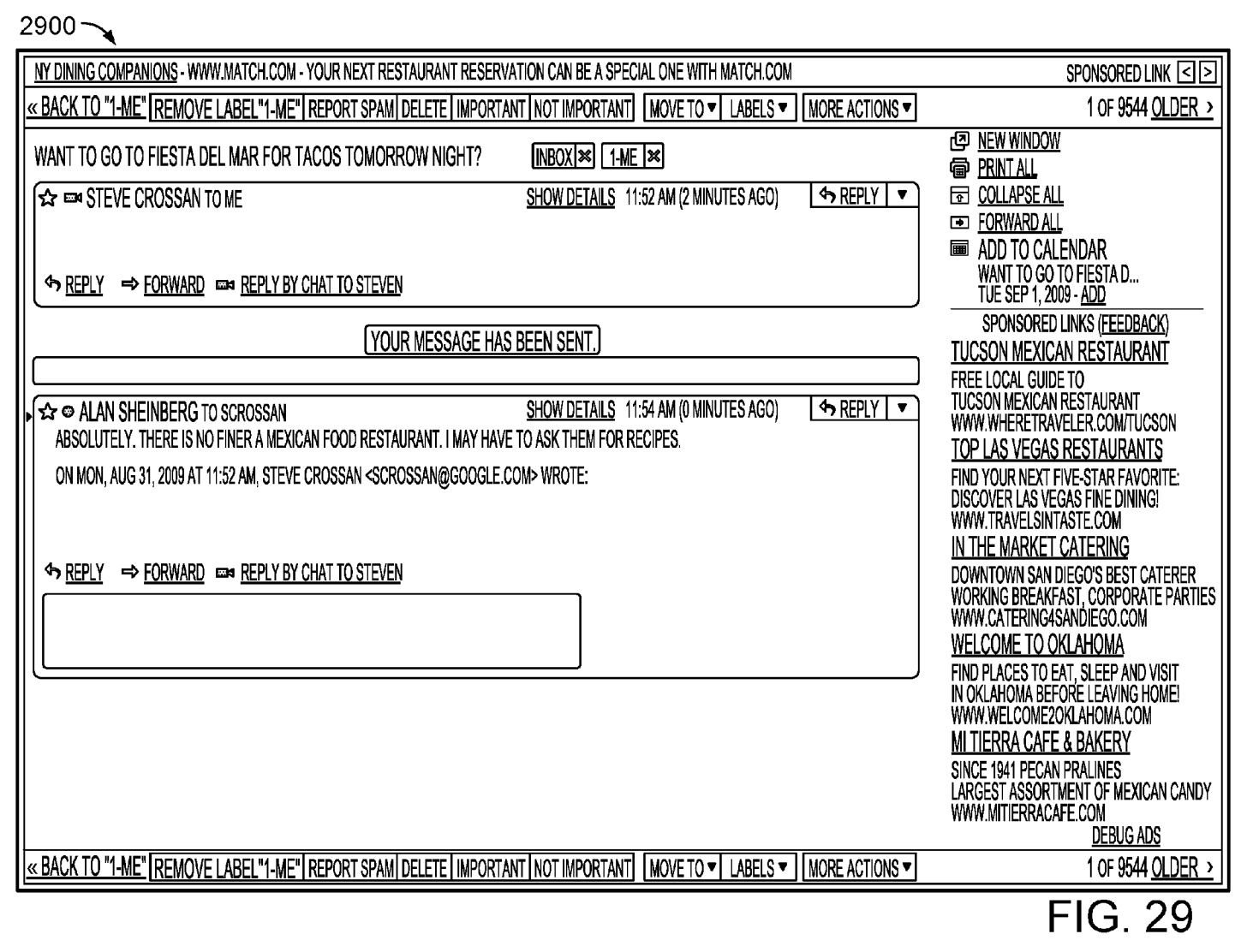

In contrast, FIG. 29 is a screen shot 2900 of a sent message that does not display matching content embedded between the sent message and the communication as a result of determining that the quality of the matching content is below a threshold.

Other implementations are within the scope of the following claims. For example the weighting associated with the reply may be used in relation to another counter that regulates how often the matching content is presented between the communication and the reply. Another counter may be used to specify the number of times that an advertisement is presented as matching content relative to other content, such as breaking news. The weighting attached to the reply message may be revised to reflect an allocated display area available for the matching content. For example, the weighting may be reduced if a reduced display area is available, thereby increasingly the requirement for matching content to be readily perceivable as being relevant. In contrast, if an allocated display area is increased, the weighting may be adjusted to reflect a user's increased ability to perceive the relevance of the matching content.

In one configuration, identification of matching content may be revised to reflect a user's navigation of an active display. For example, as a user navigates from a most recent reply to the previous reply, the weighting of the previous reply may be elevated to reflect the fact that user selection of the previous reply indicates that the user is actively viewing the previous reply.

The operations may be used in association with other messaging applications (e.g., instant messaging technologies like Google Talk and telephonic messaging protocols like SMS) and stream-based social networking services. In one configuration, matching content may be added to the customized display that a user sees after the user sends an instant message or posts an update. The matching content may be associated with a timer so that it is removed after a specified amount of time has elapsed, or it may be customized so that the matching content is only presented to the sending/publishing user and not a larger audience.

In some implementations, the presentation of matching content can be made during the drafting of a reply. For example, matching content that is derived from the original communication or entered portions of a reply can be presented along with the draft reply in a compose window. The compose window can include the original communication (to which the reply is directed) and/or other portions of the conversation along with compose fields (e.g., "to" field, subject field, message body field). Matching content can be presented during the drafting and updated as more of the reply message is provided (i.e., with better matching content).

The foregoing description, for purpose of explanation, has been described with reference to specific implementations. However, the illustrative discussions above are not intended to be exhaustive or to limit the precise forms disclosed. Many modifications and variations are possible in view of the above teachings.

What is claimed is:

1. A method performed by one or more processing devices, the method comprising:
    identifying, by at least one processing device, an electronic conversation between at least two users, the electronic conversation comprising at least:
    (i) a communication message of the electronic conversation, and
    (ii) a reply message of the electronic conversation that is responsive to the communication message;
    determining, by the at least one processing device, one or more content categories that correspond to at least:
    (i) the communication message of the electronic conversation, or
    (ii) the reply message of the electronic conversation;
    generating, by the at least one processing device, content based on the determined one or more content categories, where generating the content comprises:
    extracting a subset of terms from the electronic conversation;
    identifying information relevant to the electronic conversation based on analysis of the extracted subset of terms; and
    generating the content using the identified information relevant to the electronic conversation; and
    generating, by the at least one processing device, a concurrent presentation of the content and the reply message in a graphical user interface.

2. The method of claim 1, wherein determining the one or more content categories comprises:
    associating, by the at least one processing device, the electronic conversation with at least a first category of the one or more content categories, the first category comprising a category identifier.

3. The method of claim 2, wherein generating the content comprises:
    extracting the subset of terms from at least one message of the electronic conversation based on the category identifier, where extracting the subset of terms comprises using the category identifier to extract terms that correspond to the category identifier.

4. The method of claim 3, wherein of the electronic conversation, the subset of terms are extracted from a body of the communication message or a body of the reply message.

5. The method of claim 1, wherein determining the one or more content categories comprises:
   determining, by the at least one processing device, a number of content elements that are associated with a particular category of a category content list, the content elements comprising one or more terms included in the electronic conversation; and
   determining, by the at least one processing device, the one or more content categories when the number of content elements has reached a threshold number.

6. The method of claim 5, wherein determining the number of content elements that are associated with a particular category of the category content list comprises:
   comparing the category content list to content of the electronic conversation by at least one of:
      identifying a number of times a particular content element of the category content list appears in the electronic conversation; or
      determining the highest ratio of content elements which belong to the particular category as compared to a total number of content elements present in the electronic conversation.

7. The method of claim 1, wherein the communication message comprises text that was sent from a first user account for delivery to a second user account, and wherein the reply message comprises at least text being drafted by a user of the second user account for delivery to the first user account.

8. The method of claim 7, generating the presentation of the content and the reply in a graphical user interface comprises:
   causing the content to be positioned proximate to the reply in the graphical user interface at a display of a computer that is logged into the second user account while the reply is being drafted by a user of the second account at the computer.

9. The method of claim 1, wherein determining the one or more content categories comprises:
   identifying a first selected message of the electronic conversation based on at least one of a display mode of the first selected message or a time factor of the first selected message, the first selected message being one of the communication message or the reply message; and
   determining, by the at least one processing device, one or more content categories using text of the first selected message.

10. The method of claim 9, wherein the display mode is an expanded display mode and the time factor indicates that a particular message is the most recently received message.

11. The method of claim 9, wherein the content comprises one of an advertisement or active content, and the one or more content categories comprises one of categories of things, categories of activities, categories of processes, or categories of concepts.

12. An electronic system comprising:
    one or more processing devices; and
    one or more non-transitory computer-readable media storing instructions that are executable by the one or more processing devices to cause performance of operations comprising:
       identifying, by at least one processing device, an electronic conversation between at least two users, the electronic conversation comprising at least:
          (i) a communication message of the electronic conversation, and
          (ii) a reply message of the electronic conversation that is responsive to the communication message;
       determining, by the at least one processing device, one or more content categories that correspond to at least:
          (i) a communication message of the electronic conversation, or
          (ii) a reply message of the electronic conversation that is responsive to the communication message;
       generating, by the at least one processing device, content based on the determined one or more content categories, where generating the content comprises:
          extracting a subset of terms from the electronic conversation;
          identifying information relevant to the electronic conversation based on analysis of the extracted subset of terms; and
          generating the content using the identified information relevant to the electronic conversation; and
       generating, by the at least one processing device, a concurrent presentation of the content and the reply message in a graphical user interface.

13. The electronic system of claim 12, wherein determining the one or more content categories comprises:
    associating, by the at least one processing device, the electronic conversation with at least a first category of the one or more content categories, the first category comprising a category identifier.

14. The electronic system of claim 13, wherein generating the content comprises:
    extracting the subset of terms from at least one message of the electronic conversation based on the category identifier, where extracting the subset of terms comprises using the category identifier to extract terms that correspond to the category identifier.

15. The electronic system of claim 14, wherein of the electronic conversation, the subset of terms are extracted from a body of the communication message or a body of the reply message.

16. The electronic system of claim 12, wherein determining the one or more content categories comprises:
    determining, by the at least one processing device, a number of content elements that are associated with a particular category of a category content list, the content elements comprising one or more terms included in the electronic conversation; and
    determining, by the at least one processing device, the one or more content categories when the number of content elements has reached a threshold number.

17. The electronic system of claim 12, wherein determining the one or more content categories comprises:
    identifying a first selected message of the electronic conversation based on at least one of a display mode of the first selected message or a time factor of the first selected message, the first selected message being one of the communication message or the reply message; and determining, by the at least one processing device, one or more content categories using text of the first selected message.

18. The electronic system of claim 12, wherein the communication message comprises text that was sent from a first user account for delivery to a second user account, and wherein the reply message comprises at least text being drafted by a user of the second user account for delivery to the first user account.

19. The electronic system of claim 12, wherein the content comprises one of an advertisement or active content, and the one or more content categories comprises one of categories of things, categories of activities, categories of processes, or categories of concepts.

20. One or more non-transitory computer-readable media storing instructions that are executable by one or more processing devices to cause performance of operations comprising:
- identifying, by at least one processing device, an electronic conversation between at least two users, the electronic conversation comprising at least:
  - (i) a communication message of the electronic conversation, and
  - (ii) a reply message of the electronic conversation that is responsive to the communication message;
- determining, by the at least one processing device, one or more content categories that correspond to at least:
  - (i) a communication message of the electronic conversation, or
  - (ii) a reply message of the electronic conversation that is responsive to the communication message;
- generating, by the at least one processing device, content based on the determined one or more content categories, where generating the content comprises:
  - extracting a subset of terms from the electronic conversation;
  - identifying information relevant to the electronic conversation based on analysis of the extracted subset of terms; and
  - generating the content using the identified information relevant to the electronic conversation; and
- generating, by the at least one processing device, a concurrent presentation of the content and the reply message in a graphical user interface.

21. The method of claim 1, wherein the determining the one or more content categories includes:
- accessing the reply message of the electronic conversation;
- analyzing one or more terms included in the reply message; and
- determining the one or more content categories based on the analysis of the one or more terms included in the reply message.

22. The method of claim 1, wherein the electronic conversation is accessible via a client device and generating the content comprises:
- receiving, at the client device, the content from a content source that is external to the client device, the external content source being an information service that is configured to extract one or more terms of the electronic conversation.

23. The method of claim 2, wherein generating the content comprises:
- accessing a filter data structure that stores a filtering list, the filtering list including the category identifier and content elements that correspond to the first category; and
- extracting the subset of terms from a portion of the electronic conversation using the filtering list, where extracting the subset of terms includes filtering out terms in the portion of the electronic conversation that match the content elements of the filtering list.

24. The method of claim 2, wherein generating the content comprises:
- accessing an anonymization filter configured to anonymize personally identifiable information included in the electronic conversation, the personally identifiable information comprising an identifier for a participant in the electronic conversation; and
- extracting the subset of terms from a portion of the electronic conversation using the anonymization filter, where extracting the subset of terms includes filtering out the personally identifiable information.

* * * * *